United States Patent
Bohannon et al.

(10) Patent No.: US 11,673,347 B2
(45) Date of Patent: Jun. 13, 2023

(54) TENDON SLEEVE FOR HIGH-ALTITUDE BALLOON AND SYSTEM FOR MAKING THE SAME

(71) Applicant: Aerostar International, LLC, Columbia, MD (US)

(72) Inventors: Derek Lee Bohannon, Sulphur Springs, TX (US); Mary Jane Palmer, Sulphur Springs, TX (US); Michael William Zimmerman, Greenville, TX (US)

(73) Assignee: Aerostar International, LLC, Columbia, MD (US)

( * ) Notice: Subject to any disclaimer, the term of this patent is extended or adjusted under 35 U.S.C. 154(b) by 1020 days.

(21) Appl. No.: 16/457,366

(22) Filed: Jun. 28, 2019

(65) Prior Publication Data

US 2019/0322346 A1 Oct. 24, 2019

Related U.S. Application Data

(62) Division of application No. 15/013,177, filed on Feb. 2, 2016, now abandoned.

(Continued)

(51) Int. Cl.
*B29C 65/00* (2006.01)
*B64B 1/58* (2006.01)
(Continued)

(52) U.S. Cl.
CPC .... *B29C 66/53261* (2013.01); *B29C 65/7433* (2013.01); *B29C 65/7439* (2013.01);
(Continued)

(58) Field of Classification Search
CPC .......... B29C 66/53261; B29C 65/7433; B29C 65/7439; B29C 65/7894; B29C 66/133;
(Continued)

(56) References Cited

U.S. PATENT DOCUMENTS 1,648,630 A  11/1927 Upson
1,682,405 A  8/1928 Hermann
(Continued)

FOREIGN PATENT DOCUMENTS

FR  1347773 A  1/1964
JP  3903202 B2  4/2007
(Continued)

OTHER PUBLICATIONS

"Indian Application Serial No. 201614003593, First Examination Report dated Mar. 3, 2020", (w/ English Translation), 6 pgs.
(Continued)

*Primary Examiner* — Cynthia L Schaller
(74) *Attorney, Agent, or Firm* — Kim and Lahey Law Firm, LLC

(57) ABSTRACT

A system for forming a tendon sleeve on an atmospheric balloon is described herein, the system comprising a coupling assembly including a seam coupling mechanism that forms a seam joint between a first gore panel and a second gore panel, the seam joint is spaced from respective first and second lateral edges of the first and second gore panels to form first and second edge flanges, and an edge coupling mechanism that forms an edge joint between the first and second edge flanges and closes a tendon sleeve, the edge joint spaced from the seam joint, the tendon sleeve includes a tendon sleeve passage between the seam joint and the edge joint and between the first and second edge flanges. The system also includes a tendon positioning mechanism that positions a tendon within the tendon sleeve passage. A tendon sleeve formed by this system is also described herein.

17 Claims, 10 Drawing Sheets

Related U.S. Application Data

(60) Provisional application No. 62/110,780, filed on Feb. 2, 2015.

(51) Int. Cl.
*B64B 1/40* (2006.01)
*B29C 65/74* (2006.01)
*B29C 65/78* (2006.01)
*B29L 22/02* (2006.01)

(52) U.S. Cl.
CPC ........ *B29C 65/7894* (2013.01); *B29C 66/133* (2013.01); *B29C 66/137* (2013.01); *B29C 66/433* (2013.01); *B29C 66/4326* (2013.01); *B29C 66/53* (2013.01); *B29C 66/73921* (2013.01); *B64B 1/40* (2013.01); *B64B 1/58* (2013.01); *B29C 66/1122* (2013.01); *B29C 66/71* (2013.01); *B29C 66/723* (2013.01); *B29C 66/83423* (2013.01); *B29L 2022/022* (2013.01)

(58) Field of Classification Search
CPC . B29C 66/137; B29C 66/4326; B29C 66/433; B29C 66/53; B29C 66/73921; B29C 66/1122; B29C 66/71; B29C 66/723; B29C 66/83423; B64B 1/40; B64B 1/58; B29L 2022/022
See application file for complete search history.

(56) References Cited

U.S. PATENT DOCUMENTS

| | | |
|---|---|---|
| 1,763,835 A | 6/1930 | Upson |
| 1,944,467 A | 1/1934 | Sabin |
| 2,020,526 A | 11/1935 | Karl |
| 2,106,904 A | 2/1938 | Wilhelm |
| 2,131,155 A | 9/1938 | Waller |
| 2,232,640 A | 2/1941 | Schwartzman |
| 2,313,997 A | 3/1943 | Jackson |
| 2,365,827 A | 12/1944 | Liebert |
| 2,492,800 A | 12/1949 | Langley |
| 2,602,609 A | 7/1952 | Huch et al. |
| 2,656,293 A | 10/1953 | Huch |
| 2,660,218 A * | 11/1953 | Johnson .............. B29C 65/7435 156/496 |
| 2,666,006 A | 1/1954 | La Mere et al. |
| 2,666,600 A | 1/1954 | Huch et al. |
| 2,679,224 A | 5/1954 | Sturtevant |
| 2,703,769 A | 3/1955 | Stinger et al. |
| 2,756,948 A | 7/1956 | Winzen |
| 2,758,804 A | 8/1956 | Hakomaki |
| 2,767,940 A | 10/1956 | Melton |
| 2,767,941 A | 10/1956 | Gegner et al. |
| 2,858,090 A | 10/1958 | Winzen et al. |
| 2,919,082 A | 12/1959 | Winzen et al. |
| 2,960,282 A | 11/1960 | Winzen |
| 3,063,656 A | 11/1962 | Bohl et al. |
| 3,107,884 A | 10/1963 | Simko |
| 3,109,612 A | 11/1963 | Winker et al. |
| 3,182,932 A | 5/1965 | Winker |
| 3,270,987 A | 9/1966 | Winckler et al. |
| 3,312,427 A | 4/1967 | Yost |
| 3,337,162 A | 8/1967 | Bauserman |
| 3,391,883 A | 7/1968 | Curtis |
| 3,586,266 A | 6/1971 | Bucher |
| 3,654,017 A | 4/1972 | Ropiequet et al. |
| 3,706,433 A | 12/1972 | Sonstegaard |
| 4,077,588 A | 3/1978 | Hurst |
| 4,223,797 A | 9/1980 | Skakunov |
| 4,390,149 A | 6/1983 | Barnes et al. |
| 4,434,958 A | 3/1984 | Rougeron et al. |
| 4,529,153 A | 7/1985 | Conn |
| 4,696,444 A | 9/1987 | Regipa |
| 4,877,205 A | 10/1989 | Rand |
| 4,928,908 A | 5/1990 | Horii |
| 5,104,059 A | 4/1992 | Rand et al. |
| 5,115,998 A | 5/1992 | Olive |
| 5,332,177 A | 7/1994 | Boyle, Jr. |
| 5,338,243 A | 8/1994 | Kieves |
| 5,404,868 A | 4/1995 | Sankrithi, V |
| 5,417,393 A | 5/1995 | Klestadt |
| 5,588,811 A | 12/1996 | Price |
| 5,595,521 A | 1/1997 | Becker |
| 5,645,248 A | 7/1997 | Campbell |
| 5,697,579 A | 12/1997 | Hayashi |
| 5,743,786 A | 4/1998 | Lindsey |
| 5,823,468 A | 10/1998 | Bothe |
| 5,884,862 A | 3/1999 | Aurilio et al. |
| 5,890,676 A | 4/1999 | Coleman et al. |
| 6,116,538 A | 9/2000 | Hafelfinger |
| 6,189,829 B1 | 2/2001 | Brotz |
| 6,290,172 B1 | 9/2001 | Yajima et al. |
| 6,305,641 B1 | 10/2001 | Onda |
| 6,315,242 B1 | 11/2001 | Eichstedt et al. |
| 6,325,329 B1 | 12/2001 | Meadows |
| 6,386,480 B1 | 5/2002 | Perry |
| 6,425,552 B1 | 7/2002 | Lee et al. |
| 6,427,943 B2 | 8/2002 | Yokomaku et al. |
| 6,439,508 B1 | 8/2002 | Taylor |
| 6,547,189 B1 | 4/2003 | Raboin et al. |
| 6,565,037 B1 | 5/2003 | Tonkovich |
| 6,648,272 B1 | 11/2003 | Kothmann |
| 6,659,838 B1 | 12/2003 | Anderson |
| 6,685,136 B2 | 2/2004 | Yajima et al. |
| 6,698,686 B2 | 3/2004 | Ogawa et al. |
| 6,811,115 B2 | 11/2004 | Kurose |
| 7,108,228 B1 | 9/2006 | Marshall |
| 7,137,592 B2 | 11/2006 | Barocela et al. |
| 7,303,166 B2 | 12/2007 | Geery |
| D583,294 S | 12/2008 | Balaskovic |
| 7,487,936 B2 | 2/2009 | Heaven, Jr. |
| 7,490,794 B2 | 2/2009 | Heaven, Jr. |
| 7,552,893 B2 | 6/2009 | Coltlng |
| 7,568,656 B2 | 8/2009 | Handley |
| 7,669,796 B2 | 3/2010 | Nachbar |
| 7,857,256 B2 | 12/2010 | Hatton |
| 7,997,264 B2 | 8/2011 | Sankrithi, V |
| 8,052,082 B1 | 11/2011 | Herlik |
| 8,091,826 B2 | 1/2012 | Voorhees |
| 8,177,161 B2 | 5/2012 | Morehead et al. |
| 8,297,550 B2 | 10/2012 | Balaskovic |
| 8,336,810 B2 | 12/2012 | Brutoco |
| 8,342,442 B1 | 1/2013 | Dancila |
| 8,356,770 B2 | 1/2013 | Parks |
| 8,469,313 B2 | 6/2013 | Dong |
| 8,505,847 B2 | 8/2013 | Ciampa et al. |
| 8,596,571 B2 | 12/2013 | Goelet |
| 8,833,696 B1 | 9/2014 | Teller et al. |
| 9,027,874 B1 | 5/2015 | Roach et al. |
| 9,027,877 B1 | 5/2015 | Brookes et al. |
| 9,168,994 B2 | 10/2015 | Ratner |
| 9,193,480 B2 | 11/2015 | Smith et al. |
| 9,221,531 B1 | 12/2015 | Brookes |
| 9,242,712 B1 | 1/2016 | Ratner |
| 9,334,037 B1 | 5/2016 | Ratner |
| 9,371,123 B2 | 6/2016 | Roach et al. |
| 9,463,861 B2 | 10/2016 | Smith et al. |
| 9,540,091 B1 | 1/2017 | Maccallum et al. |
| 9,669,918 B1 | 6/2017 | Fourie et al. |
| 9,676,468 B1 | 6/2017 | Roach |
| 9,701,061 B1 | 7/2017 | Roach et al. |
| 9,834,297 B2 | 12/2017 | Brookes |
| 9,845,141 B2 | 12/2017 | Sehnert |
| 9,908,607 B1 | 3/2018 | Fourie et al. |
| 2001/0002686 A1 | 6/2001 | Yokomaku et al. |
| 2002/0003189 A1 | 1/2002 | Kuenkler |
| 2003/0001044 A1 | 1/2003 | Munk |
| 2003/0102404 A1 | 6/2003 | Yabe |
| 2003/0234320 A1 | 12/2003 | Colting |
| 2004/0002392 A1 | 1/2004 | Meadows |
| 2005/0130516 A1 | 6/2005 | Courtney |
| 2005/0236519 A1 | 10/2005 | Handley |

(56) References Cited

U.S. PATENT DOCUMENTS

| | | |
|---|---|---|
| 2005/0263642 A1 | 12/2005 | Geery |
| 2005/0288114 A1 | 12/2005 | Meadows |
| 2006/0065777 A1 | 3/2006 | Walden |
| 2007/0034740 A1 | 2/2007 | Li |
| 2007/0069077 A1 | 3/2007 | Colting |
| 2007/0075184 A1 | 4/2007 | Marimon |
| 2007/0238381 A1 | 10/2007 | Brewer et al. |
| 2007/0295859 A1 | 12/2007 | Colvin |
| 2008/0011900 A1 | 1/2008 | Quintana |
| 2008/0078883 A1 | 4/2008 | Jong |
| 2008/0166514 A1 | 7/2008 | Liggett |
| 2009/0072078 A1 | 3/2009 | Choi et al. |
| 2009/0145999 A1 | 6/2009 | Porter |
| 2009/0189012 A1 | 7/2009 | Liggett |
| 2009/0302150 A1 | 12/2009 | Konstantinovskiy |
| 2010/0100116 A1 | 4/2010 | Brister et al. |
| 2010/0212719 A1 | 8/2010 | Stolum |
| 2010/0243121 A1 | 9/2010 | Eigenbrode |
| 2010/0252687 A1 | 10/2010 | Hogan |
| 2010/0288875 A1 | 11/2010 | Barnes et al. |
| 2011/0174922 A1 | 7/2011 | Berman et al. |
| 2012/0018571 A1 | 1/2012 | Goelet |
| 2012/0212228 A1 | 8/2012 | Cho et al. |
| 2013/0032665 A1 | 2/2013 | Lu et al. |
| 2013/0039787 A1 | 2/2013 | Lucas |
| 2014/0001308 A1 | 1/2014 | Costa Duarte Pardal et al. |
| 2014/0027565 A1 | 1/2014 | Marvin et al. |
| 2014/0158823 A1 | 6/2014 | Smith et al. |
| 2014/0163664 A1 | 6/2014 | Goldsmith |
| 2014/0170344 A1 | 6/2014 | Pramanik et al. |
| 2014/0360660 A1* | 12/2014 | Latham .................. B29D 22/02 156/269 |
| 2015/0174817 A1 | 6/2015 | Roach et al. |
| 2015/0360763 A1 | 12/2015 | Smith et al. |
| 2016/0059951 A1 | 3/2016 | Brookes |
| 2016/0083068 A1* | 3/2016 | Crites .................. B64B 1/14 244/31 |
| 2016/0167761 A1 | 6/2016 | Roach |
| 2016/0207605 A1 | 7/2016 | Jensen et al. |
| 2016/0221661 A1 | 8/2016 | Bohannon |
| 2016/0263815 A1 | 9/2016 | Roach et al. |
| 2016/0288894 A1 | 10/2016 | Sehnert et al. |

FOREIGN PATENT DOCUMENTS

| | | |
|---|---|---|
| TW | 201429804 A | 8/2014 |
| WO | WO-8906205 A1 | 7/1989 |
| WO | WO-2014089465 A1 | 6/2014 |
| WO | WO-2015094941 A1 | 6/2015 |

OTHER PUBLICATIONS

"Indian Application Serial No. 201614003593, Response filed Aug. 28, 2020 to First Examination Report dated Mar. 3, 2020", 61 pgs.
"Indian Application Serial No. 4966/DELNP/2015, First Examination Report dated Jul. 29, 2019", (w/ English Translation), 8 pgs.
"U.S. Appl. No. 13/827,779, Examiner Interview Summary dated Apr. 27, 2015", 3 pgs.
"U.S. Appl. No. 13/827,779, Non Final Office Action dated Dec. 23, 2014", 24 pgs.
"U.S. Appl. No. 13/827,779, Notice of Allowance dated May 11, 2015", 5 pgs.
"U.S. Appl. No. 13/827,779, Notice of Allowance dated Jun. 19, 2015", 5 pgs.
"U.S. Appl. No. 13/827,779, Preliminary Amendment filed Apr. 18, 2013", 3 pgs.
"U.S. Appl. No. 13/827,779, Response filed Apr. 22, 2015 to Non Final Office Action dated Dec. 23, 2014", 14 pgs.
"U.S. Appl. No. 13/827,779, Response filed Dec. 9, 2014 to Restriction Requirement dated Oct. 9, 2014", 13 pgs.
"U.S. Appl. No. 13/827,779, Restriction Requirement dated Oct. 9, 2014", 6 pgs.
"U.S. Appl. No. 13/827,779, Supplemental Notice of Allowability dated Jun. 8, 2015", 6 pgs.
"U.S. Appl. No. 14/804,038, Non Final Office Action dated Jan. 15, 2016", 15 pgs.
"U.S. Appl. No. 14/804,038, Notice of Allowability dated Aug. 24, 2016", 2 pgs.
"U.S. Appl. No. 14/804,038, Notice of Allowance dated May 17, 2016", 10 pgs.
"U.S. Appl. No. 14/804,038, Preliminary Amendment filed Aug. 28, 2015", 6 pgs.
"U.S. Appl. No. 14/995,629, Non Final Office Action dated Oct. 2, 2017", 12 pgs.
"U.S. Appl. No. 15/013,177, Advisory Action dated Jan. 10, 2019", 4 pgs.
"U.S. Appl. No. 15/013,177, Examiner Interview Summary dated Feb. 25, 2019", 3 pgs.
"U.S. Appl. No. 15/013,177, Final Office Action dated Sep. 20, 2018", 9 pgs.
"U.S. Appl. No. 15/013,177, Non Final Office Action dated Jan. 9, 2018", 8 pgs.
"U.S. Appl. No. 15/013,177, Non Final Office Action dated Apr. 1, 2019", 11 pgs.
"U.S. Appl. No. 15/013,177, Response filed Feb. 20, 2019 to Advisory Action dated Jan. 10, 2019", 13 pgs.
"U.S. Appl. No. 15/013,177, Response filed Apr. 9, 2018 to Non Final Office Action dated Jan. 9, 2018", 10 pgs.
"U.S. Appl. No. 15/013,177, Response filed Dec. 19, 2017 to Restriction Requirement dated Oct. 19, 2017", 7 pgs.
"U.S. Appl. No. 15/013,177, Response filed Dec. 19, 2018 to Final Office Action dated Sep. 20, 2018", 11 pgs.
"U.S. Appl. No. 15/013,177, Restriction Requirement dated Oct. 19, 2017", 5 pgs.
"U.S. Appl. No. 15/061,777, Notice of Allowability dated Jun. 26, 2017", 6 pgs.
"U.S. Appl. No. 15/061,777, Notice of Allowability dated Nov. 16, 2017", 3 pgs.
"U.S. Appl. No. 15/061,777, Notice of Allowance dated Apr. 25, 2017", 12 pgs.
"U.S. Appl. No. 15/061,777, Notice of Allowance dated Aug. 3, 2017", 5 pgs.
"U.S. Appl. No. 14/804,038, Response filed Apr. 14, 2016 to Non Final Office Action dated Jan. 15, 2016", 14 pgs.
"International Application Serial No. PCT/US2013/073630, International Preliminary Report on Patentability dated Jun. 18, 2015", 10 pgs.
"International Application Serial No. PCT/US2013/073630, International Search Report dated Feb. 21, 2014", 2 pgs.
"International Application Serial No. PCT/US2013/073630, Written Opinion dated Feb. 21, 2014", 8 pgs.
"Taiwanese Application Serial No. 102144987, Office Action dated Mar. 1, 2017", (w/ English Translation), 9 pgs.
"Taiwanese Application Serial No. 102144987, Response filed Sep. 4, 2017 to Office Action dated Mar. 1, 2017", (W/ English Claims), 63 pgs.
Carlson, Leland A, et al., "Supported Film Superpressure Balloons", Report Nos. AFGL-TR-76-0306, BT-1044.10 Texas A&M, Winzen Research, Inc., Pumpkin Balloon Literature Search Prepared for Computer Sciences Corp, and NASA Wallops Flight Facility Jan. 31, 2000, (Oct. 1976), 3 pgs.
Lally, Vincent, "Balloon Materials", National Center far Atmospheric Research, Boulder, Colorado, NCAR Technical Notes, (Jun. 1967), 54-59.
Lally, Vincent, "Balloon Shapes and Stresses", National Center for Atmospheric Research, Boulder, Colorado, NCAR Technical Notes, (Jun. 1967), 3-5.
Lally, Vincent, "The Super Pressure Balloon—How It Flies", National Center for Atmospheric Research, Boulder, Colorado, NCAR Technical Notes, (Jun. 1967), 1-2.
Nishimura, J, "Activities for a Long Duration Flight System in Japan", Report No. BT-2476.06 30th COSPAR, Pumpkin Balloon Literature Search Prepared for Computer Sciences Corp, and NASA Wallops Flight Facility Jan. 31, 2000, (Jul. 1994), 4 pgs.

(56) References Cited

OTHER PUBLICATIONS

Raven Staff, "Heat Sealed Shell Assembly (Engineering Design and Specifications Document)", Raven Industries, Inc., Pumpkin Balloon Literature Search Prepared for Computer Sciences Corp, and NASA Wallops Flight Facility Jan. 31, 2000, (Jan. 13, 2000), 4 pgs.

Roach, Kevin, et al., "System for Constructing Ballon Envelopes", Indian Application Ser. No. IN 201647019826A, published Aug. 31, 2016, 1 pg.

Rougeron, M, "Up to Date CNES Balloon Studies", Report No. BT-1156 or BT-1045.02, Pumpkin Balloon Literature Search Prepared for Computer Sciences Corp, and NASA Wallops Flight Facility Jan. 31, 2000, (Aug. 1978), 8 pgs.

Schur, Willi W, "Analysis of Load Tape Constrained Pneumatic Envelopes", Report No. AIAA-99-1526, Pumpkin Balloon Literature Search Prepared for Computer Sciences Corp. and NASA Wallops Flight Facility Jan. 31, 2000, (1999), 4 pgs.

Schur, Willi W, "Structural Analysis of Balloons Employing Various Techniques to Overcome Difficulties Posed by the Unconstrained Nature of these Systems", Report No. AIAA-96-0577, Pumpkin Balloon Literature Search Prepared for Computer Sciences Corp, and NASA Wallops Flight Facility Jan. 31, 2000, (Jan. 1996), 2 pgs.

Schur, Willi W, "Super-Pressure Balloon-Designs where the Global Pressure Containing Function is Primarily Assigned to the Load Tapes: The Pumpkin Balloon", Pumpkin Balloon Literature Search Prepared for Computer Sciences Corp, and NASA Wallops Flight Facility Jan. 31, 2000, (Aug. 31, 1998), 4 pgs.

Scott, Pamela G, "Long Duration Balloon Technology Survey", Report Nos. WII-9942-01-TR-01, BT-2422 Winzen International, Inc., Pumpkin Balloon Literature Search Prepared for Computer Sciences Corp. and NASA Wallops Flight Facility Jan. 31, 2000, (Mar. 11, 1989), 2 pgs.

Sharma, Amol, "Floating a New Idea For Going Wireless, Parachute Included", Wall Street Journal, (Feb. 20, 2008), 3 pgs.

Smalley, J H, "Development of the e-Balloon", Report Nos. AFCRL-70-0543, BT-1040.16, AD-717 149 National Center for Atmospheric Research, Pumpkin Balloon Literature Search Prepared for Computer Sciences Corp. and NASA Wallops Flight Facility Jan. 31, 2000, (Jun. 1970), 9 pgs.

Smith, I Steve, et al., "Floating in Space", Scientific American, Pumpkin Balloon Literature Search Prepared for Computer Sciences Corp. and NASA Wallops Flight Facility Jan. 31, 2000, (Nov. 1999), 2 pgs.

Smith, I S, "The Ultra Long Duration Balloon Project: A New Capability", Report No. AIAA-99-3866, Pumpkin Balloon Literature Search Prepared for Computer Sciences Corp. and NASA Wallops Flight Facility Jan. 31, 2000, (Jun. 1999), 2 pgs.

Smith, M S, et al., "Development of Future Concepts and Plans for the ULDB Program", Report No. AIAA 99-3868 Raven Industries, Inc., Pumpkin Balloon Literature Search Prepared for Computer Sciences Corp. and NASA Wallops Flight Facility Jan. 31, 2000, (Jun. 1999), 6 pgs.

Smith, Michael, "Multi-Gore Lobed Balloon", Raven Industries, Inc., Pumpkin Balloon Literature Search Prepared for Computer Sciences Corp. and NASA Wallops Flight Facility Jan. 31, 2000, (Jul. 13, 1999), 4 pgs.

U of Minnesota Staff, "Research and Develpment in the Field of High Altitude Plastic Balloons—vol. IX", Report No. BR-1593; AD-68 416 University of Minnesota, Pumpkin Balloon Literature Search Prepared for Computer Sciences Corp. and NASA Wallops Flight Facility Jan. 31, 2000, (Dec. 1953), 7 pgs.

Winker, J. A., "Pumpkins and Onions and Balloon Design", Adv. Space Res., 30(5), (2002), 1199-1204.

Winkler, J, "Poly "Pumpkin" Model Balloon Test (unpublished notes and photos)", Raven Industries, Inc., Pumpkin Balloon Literature Search Prepared for Computer Sciences Corp. and NASA Wallops Flight Facility Jan. 31, 2000, (1959), 2 pgs.

Yajima, N, "A New Design and Fabrication Approach for Pressurized Balloon", 32nd COSPAR, Pumpkin Balloon Literature Search Prepared for Computer Sciences Corp. and NASA Wallops Flight Facility Jan. 31, 2000, (Jul. 1998), 6 pgs.

Yajima, Nobuyuki, "A New Design Concept of Natural Shape Balloon for High Pressure Durability", Report No. AIAA-99-3880 1999 AIAA Conf., Pumpkin Balloon Literature Search Prepared for Computer Sciences Corp. and NASA Wallops Flight Facility Jan. 31, 2000, (Jun. 1999), 8 pgs.

* cited by examiner

TENDON SLEEVE FOR HIGH-ALTITUDE
BALLOON AND SYSTEM FOR MAKING
THE SAME

CROSS-REFERENCE TO RELATED
APPLICATION

This application claims priority to U.S. patent application Ser. No. 15/013,177, filed Feb. 2, 2016, which claims priority to U.S. Provisional Patent Application 62/110,780, filed on Feb. 2, 2015, which application is incorporated by reference herein in its entirety.

BACKGROUND

This document pertains generally, but not by way of limitation, to balloons and inflatable bladders having atmospheric application. Lobed balloons are used in high-altitude ballooning. Lobed balloons, in some examples have a relatively high curvature that allows for larger diameter balloons using relatively thin material for the balloon material. In at least some examples, payloads including instruments, communications equipment and the like are coupled with or suspended from the lobed balloon. The payloads, in some examples, are configured to conduct operations (e.g., observation, communication and the like) at the high altitudes lobed balloons reach, for instance an altitude of around 20 miles.

Examples of lobed balloons are constructed with a lightweight material that is provided in shaped panels of material, e.g., a gore pattern, that extend from top apex to a bottom apex and taper from near a midpoint toward the top and bottom apexes. The shaped gore panels are bonded to one another along their respective longitudinal edges to form the balloon. The balloon with gores arranged in this fashion includes a plurality of longitudinal seams extending from the top to the bottom of the balloon, with one seam between adjacent shaped panels (or gores). The wider midpoint of each of the shaped panels provides the outwardly curving shape of the balloon with respect to the narrower top and bottom apexes.

SUMMARY

This disclosure describes atmospheric balloons including sleeves for securing tendons to the balloon, where the tendons provide structural integrity to the balloon during high-altitude operation of the balloons. The sleeves are formed by coupling together adjacent gore panels that form the balloon membrane in such a way that a portion of each adjacent gore panel forms an edge flange. The respective edges flanges are coupled together to form a sleeve with a passage in which the tendon is received. This disclosure also describes systems and methods for forming the tendon sleeves.

In an example, an atmospheric balloon system is described herein. The balloon system comprising a balloon including a balloon membrane having a plurality of gore panels, a plurality of tendons extending from near an upper apex to a lower apex of the balloon, and a plurality of tendon sleeves each located at intersections between adjacent gore panels. Each of the plurality of tendon sleeves includes first and second edge flanges of respective adjacent gore panels, a seam joint coupling the first and second edge flanges, and an edge joint coupling the first and second edge flanges, the edge joint spaced from the seam joint to form a sleeve passage between the seam joint and the edge joint and the first and second edge flanges, wherein one of the plurality of tendons is received within the sleeve passage of the tendon sleeve.

A system for forming a tendon sleeve on an atmospheric balloon is also described. The system includes a coupling assembly comprising a seam coupling mechanism that forms a seam joint between a first gore panel and a second gore panel, the seam joint is spaced from respective first and second lateral edges of the first and second gore panels to form first and second edge flanges, and an edge coupling mechanism that forms an edge joint between the first and second edge flanges and closes a tendon sleeve, the edge joint spaced from the seam joint. The tendon sleeve includes a tendon sleeve passage between the seam joint and the edge joint and between the first and second edge flanges. The system also includes a tendon positioning mechanism, the tendon positioning mechanism positions a tendon within the tendon sleeve passage.

A method of forming a tendon sleeve on an atmospheric balloon is also described. The method includes coupling a first gore panel comprising a first lateral edge to a second gore panel comprising a second lateral edge by forming a seam joint spaced from the first and second lateral edges, coupling the first and second edge flanges together at an edge joint spaced from the seam joint to form a tendon sleeve with a tendon sleeve passage between the seam joint and the edge joint and the first and second edge flanges, and positioning a tendon within the tendon sleeve passage.

BRIEF DESCRIPTION OF THE FIGURES

In the figures, which are not necessarily shown to scale, like numerals or names may describe similar components in different views. The figures illustrate generally, by way of example, but not by way of limitation, various embodiments discussed in the present document.

DETAILED DESCRIPTION

The following Detailed Description describes an improvement of high-altitude balloons that are designed for stratospheric flight. The balloons include tendon sleeves for securing tendons at a seam between adjacent gore panels of the balloon. The tendon sleeve allows for a simple structure that secures a tendon to a substantially fixed position by using a portion of each of two adjacent gore panels to form the tendon sleeve. In some examples, the methods and systems described herein provide for substantially simultaneous formation of the joint between the adjacent gore panels, formation of the tendon sleeve, and coupling the tendon and the tendon sleeve to the balloon.

The methods and systems described herein eliminate or reduce the need for separate manufacture of the tendon sleeve, as well as the need to wind the tendon and sleeve onto a secondary spool before attaching the tendon sleeve to the balloon. The systems and methods described herein, therefore, simplify the process of manufacturing atmospheric balloons formed from gore panels as well as simplifying the design of the balloon itself. The systems and methods described herein provide for a more efficient manufacturing process, reducing waste and balloon weight. As described in more detail below, the systems and method described herein also allow for easier formation of foreshortened tendons. The systems and methods described herein also allow for formation of prefabricated (e.g., precut) tendons, or non-prefabricated tendons, depending on what is better for the particular application.

The tendon sleeves described herein are formed on a balloon that is used for long duration stratospheric flight of payloads. In some examples, the balloon has limited steering capability along the flight path occurring as a result of varying wind directions at flight altitudes.

Figure 1:
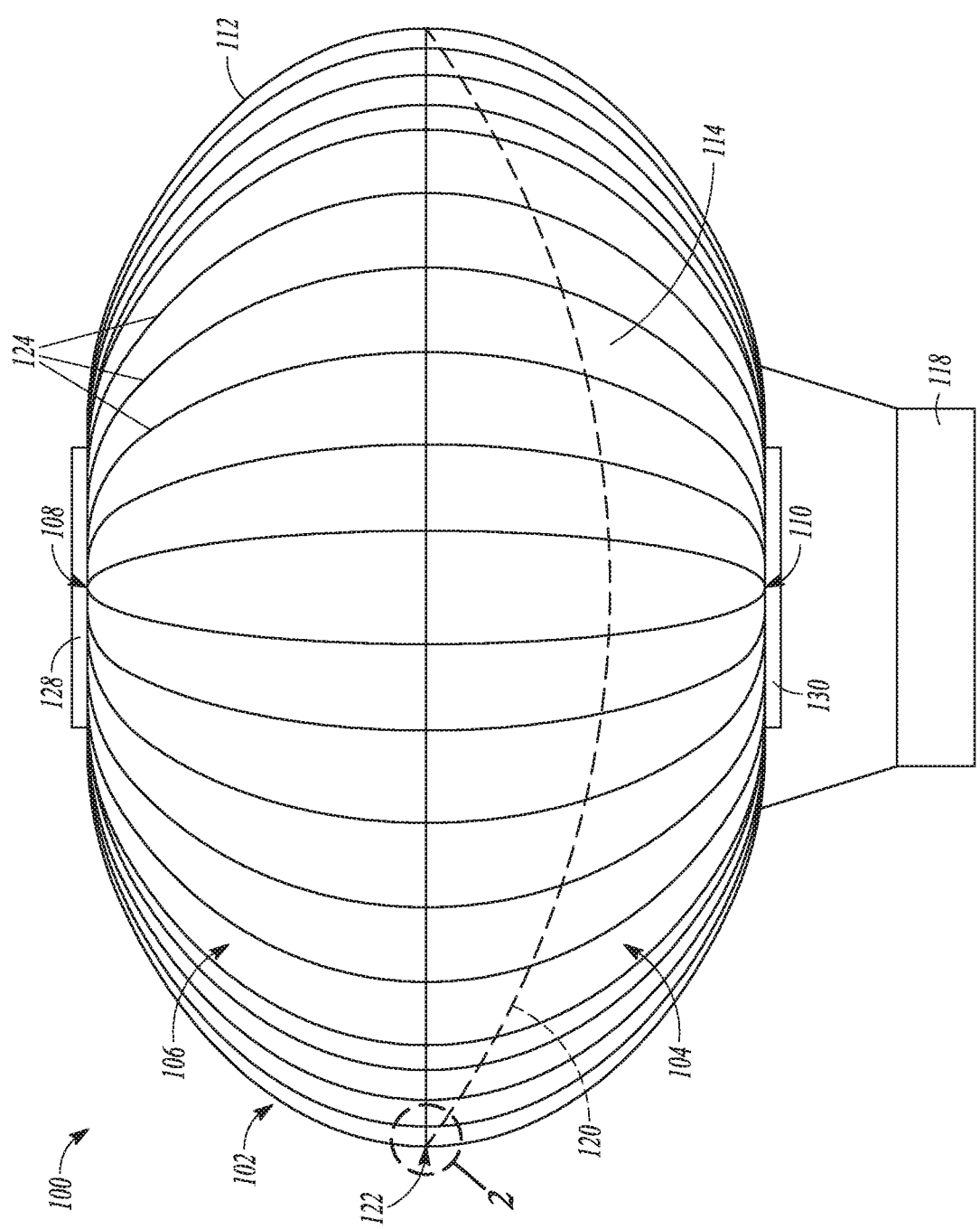
FIG. 1 is a side perspective view of an example atmospheric balloon system configured for high-altitude flight.

FIG. 1 shows an example of a high altitude balloon system 100. The example high altitude balloon system 100 includes a balloon 102 comprising one or more chambers 104, 106. The balloon 102 is sometimes referred to as a pumpkin balloon 102 or a lobed balloon 102. The balloon 102 includes an upper apex 108 and a lower apex 110. A balloon membrane 112 encloses the one or more chambers 104, 106. The balloon membrane 112 is formed from a plurality of gore panels 114 coupled together along gore panel seams 116. The gore panels 114 cooperate to collectively form the balloon membrane 112

In some examples, a payload 118 is coupled to the balloon 102, such as by being suspended from the balloon 102. In some examples, the payload 118 includes instruments, or communication devices, or both, or includes other structures or devices to provide additional functionality to the balloon system 100, such as a propulsion system. In an example, instruments in the payload 118 provide for observation beneath and around the balloon system 100. In some examples, communication devices in the payload 118 allow for communication, e.g., transmission of information, reception of information and the like.

In an example, the payload 118 includes a balloon volume controller that controls the volume of each of the one or more balloon chambers 104, 106. In an example, the balloon volume controller controls one or more blowers that are mounted to the payload 118 or to the balloon 102 and that blow atmospheric air into an air ballast chamber 104 to control the relative volume of the air ballast chamber 104 relative to a lift gas chamber 106 that contains a lift gas, such as helium, within the balloon 102.

The lift gas chamber 106 is separated from the air ballast chamber 104 within the balloon membrane 112. In an example, the air ballast chamber 104 and the lift gas chamber 106 are separated by a deflectable diaphragm 120 positioned within the balloon 102. In an example, the deflectable diaphragm 120 is coupled across the balloon 102 by extending inwardly from a circumferential edge 122 of the balloon 102. The deflectable diaphragm 120 is interposed between the air ballast chamber 104 and the lift gas chamber 106 during construction of the balloon 102. As the balloon 102 is formed, the deflectable diaphragm 120 is coupled to the gore panels 114 to accordingly form a triple layered dual chamber balloon 102 with the deflectable diaphragm 120 interposed and coupled between an upper portion of the gore panels 114 and a lower portion of the gore panels 114. In an example, the lift gas chamber 106 is formed by the upper portions of the gore panels 114 and the deflectable diaphragm 120, and the air ballast chamber 104 is formed by the lower portions of the gore panels 114 and the deflectable diaphragm 120.

In some examples, the deflectable diaphragm 120 is coupled across another portion of the balloon 102 other than at the circumferential edge 122. In an example, the deflectable diaphragm 120 has a smaller perimeter than the circumferential edge 122 and is coupled to the balloon membrane 112 closer to either the upper apex 108 or the lower apex 110. In another example, the deflectable diaphragm 120 is provided as a nested balloon formed of a second membrane within the balloon membrane 112. In an example, the deflectable diaphragm 120 is a ballonet coupled with the balloon 102 at one of the upper apex 108 or the lower apex 110.

The balloon system 100 also includes a plurality of tendons 124 extending from the upper apex 108 to the lower apex 110. The tendons 124 are distributed around the balloon membrane 112 to provide structural integrity to the balloon 102 and maintain the balloon volume constant (e.g., constant, near constant, substantially constant, or the like after inflation and during flight of the high altitude balloon system 100. Examples of tendons 124 include, but are not limited to, cables, biodegradable filaments, or the like.

Figure 2:
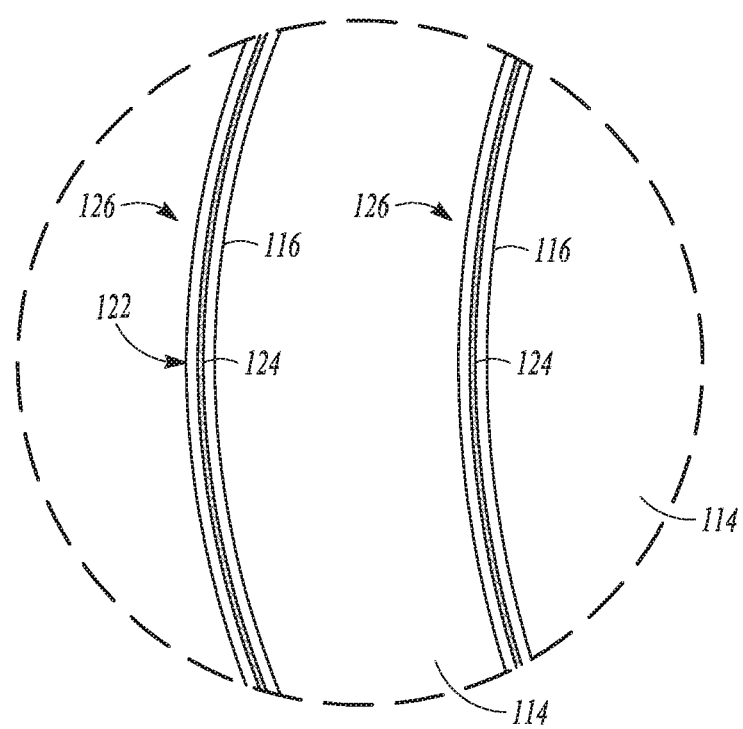
FIG. 2 is a close-up view of adjacent gore panels of the atmospheric balloon system of FIG. 1 shown at detail 2 in FIG. 1.

Each of the tendons 124 is secured within a tendon sleeve 126 at one of the gore panel seams. The tendon sleeves 126 are coupled to the balloon membrane 112 at the gore panel seams 116. The tendon sleeves 126 maintain the tendons in a distributed fashion around the balloon outer surface. In an example described in more detail below, each tendon sleeve 126 is formed from excess portion of the film material that forms adjacent gore panels 114 that are sealed together so that the tendon sleeves 126 are integrally coupled to the gore panels 114. FIG. 2 shows a close up view of a few of the gore panels 114 with tendons 124 fed through corresponding tendon sleeves 126 at the gore panel seams 116 of the balloon system 100.

In an example, each of the plurality of tendons 124 is coupled to the upper apex 108 and the lower apex 110. In an example, an upper apex plate 128 is mounted to the balloon membrane 112 at the upper apex 108 and a lower apex plate 130 is mounted to the balloon membrane 112 at the lower apex 110. The plurality of tendons 124 are coupled to the upper apex plate 128 and the lower apex plate 130. In an example, each of the apex plates 128, 130 includes a plurality of tendon anchors, wherein an upper end of each of the plurality of tendons 124 is coupled to a corresponding one of the plurality of tendon anchors of the upper apex plate 128 and a lower end of each of the tendons 124 is coupled to a corresponding tendon anchor of the lower apex plate 130.

Figure 3:
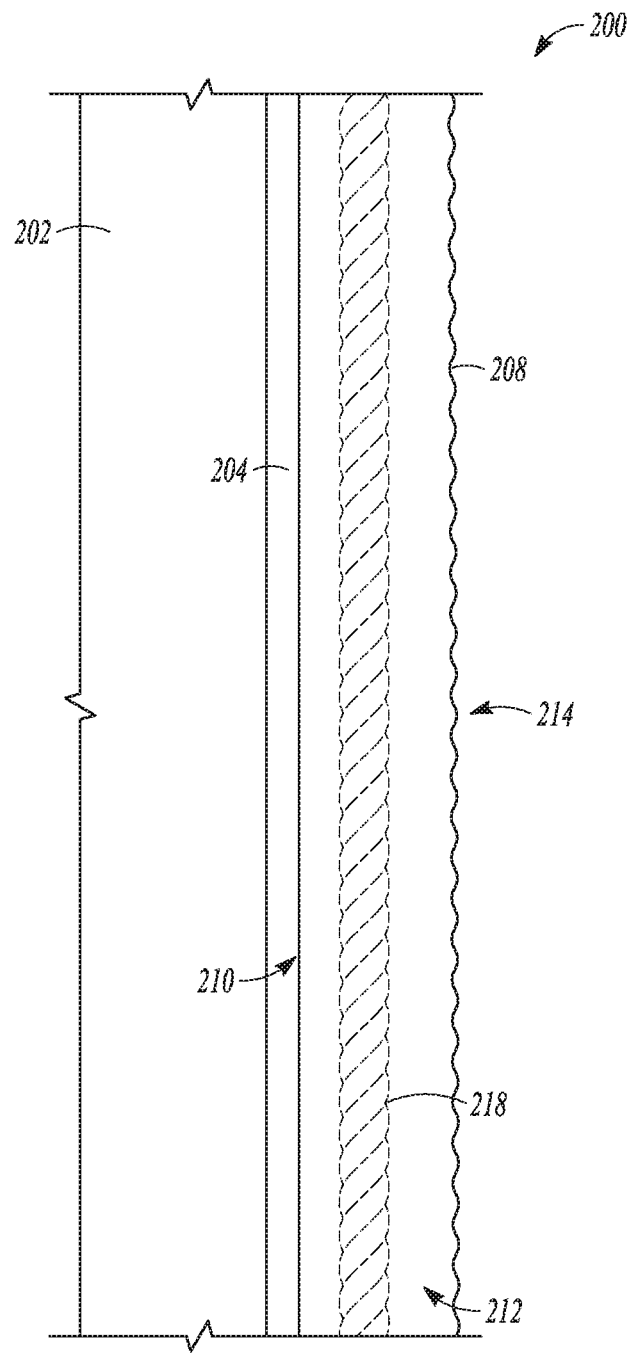
FIG. 3 is a detailed view of an example tendon sleeve for securing a tendon at a seam between adjacent coupled gore panels.
Figure 4:
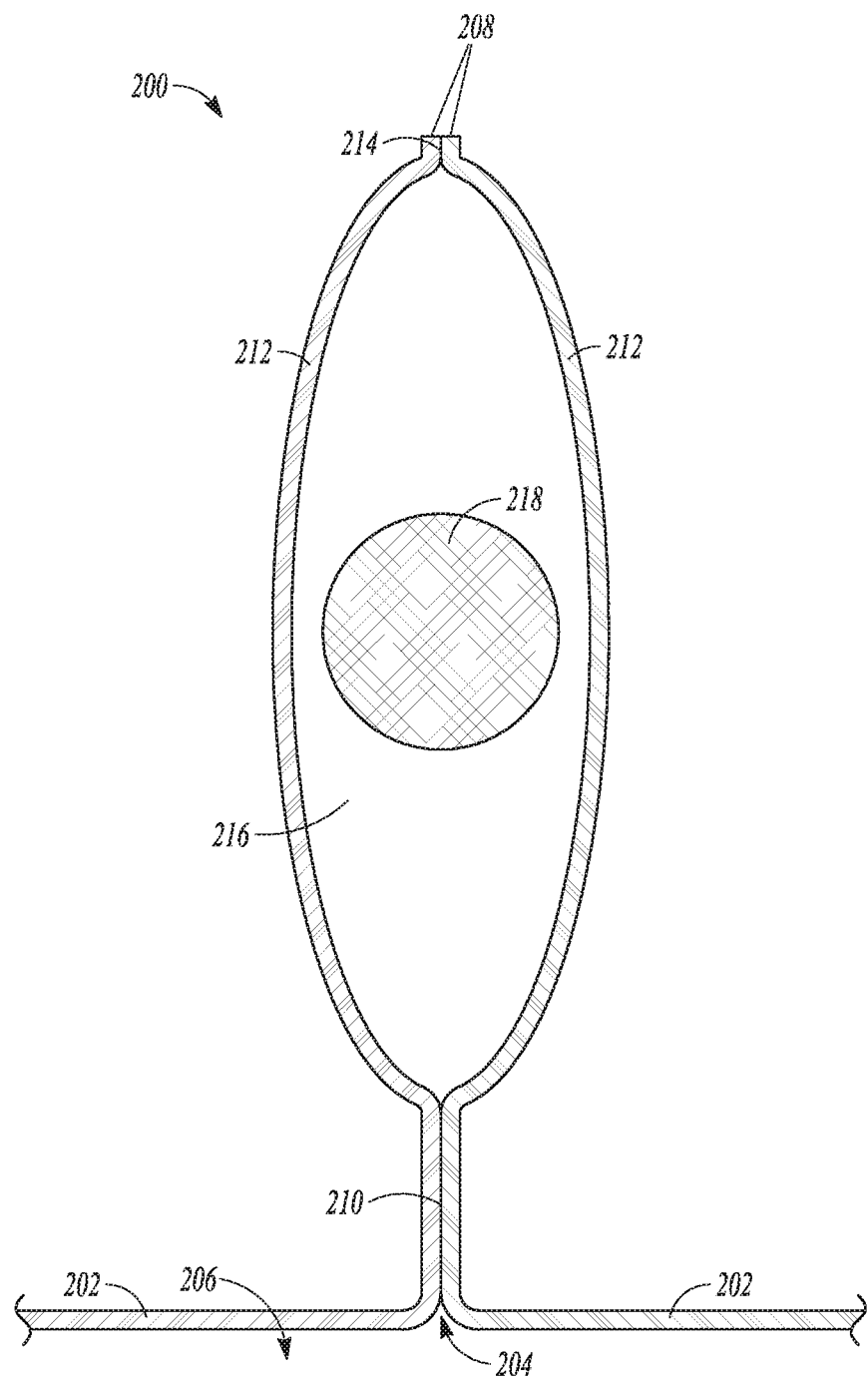
FIG. 4 is a cross-sectional view of the example tendon sleeve of FIG. 3.

FIG. 3 shows a close-up view of an example tendon sleeve 200 formed by sealing adjacent gore panels 202 together to form a gore panel seam 204 and to form the tendon sleeve 200. FIG. 4 shows a cross-sectional view of the example tendon sleeve 200. FIG. 3 shows the tendon sleeve 200 after it has been formed, but before the balloon has been inflated, while FIG. 4 shows the tendon sleeve 200 after inflation of the balloon, e.g., after injection of a gas such as a ballast gas or a lift gas, e.g., helium, into a balloon interior 206. Optionally, in an example, the tendon sleeve 200 is positioned along the interior of the balloon, for instance, the tendon sleeve 200 is on the opposed side of the gore panels 202 along with the balloon interior 206. In an example, one or more, and in some examples all of, the tendon sleeves 126 of the balloon system 100 shown in FIGS. 1 and 2 are formed in the form of the example tendon sleeve 200 of FIGS. 3 and 4.

As shown in FIGS. 3 and 4, each of the adjacent gore panels 202 includes a lateral edge 208, and the adjacent gore panels 202 are coupled together at an intersection between the adjacent gore panels 202 to form a seam joint 210 between the adjacent gore panels 202. In an example, the seam joint 210 is spaced from the lateral edges 208 of the adjacent gore panels 202. The spacing between the gore panel lateral edges 208 and the seam joint 210 forms an edge flange 212 being formed for each adjacent gore panel 202. In an example, the edge flanges 212 of the adjacent gore panels 202 are each formed of a strip of the film material of a corresponding gore panel 202 that protrudes from the seam joint 210. In an example, the edge flanges 212 are each a portion or region of a corresponding gore panel 202 that extends from the seam joint 210 to a corresponding one of the lateral edges 208.

The example tendon sleeve 200 of FIGS. 3 and 4 is formed from the edge flanges 212 by coupling the lateral edges 208 of the edge flanges 212 together to form a sleeve (e.g., of the material that makes up the gore panels 202). In this way, the tendon sleeve 200 is positioned on or adjacent to the balloon membrane (which is collectively formed by the gore panels 202) at an intersection between the adjacent gore panels 202. In an example, the adjacent gore panels 202 are sealed together at the seam joint 210, for example so that the seam joint 210 comprises a seam seal that seals the polymeric material of polymeric gore panels 202 together. The seam seal formed at the seam joint 210 prevents (e.g., minimizes, stops, prevents, reduces, or the like) leaking of the lift gas or the ballast gas from the balloon interior 206. As used herein, the term "seal," when referring to sealing a polymeric material of the gore panel 202 at the seam joint 210, includes, but is not limited to, the polymeric material of the gore panels 202 being coupled together substantially continuously at a macromolecular level so that at least 99% (on a weight flow rate basis) of the passage of the lift gas through the seam joint 210 is via intermolecular diffusion, such as at least 99.5%, for example at least 99.9%, or all (100%), of the passage of the lift gas though the seam joint 210 is via intermolecular diffusion, rather than via the flow of lift gas through openings along the seam joint 210.

The edge flanges 212 are coupled together proximate to the lateral edges 208 of the adjacent gore panels 202 by an edge joint 214. In an example, the edge joint 214 is formed by coupling the edge flanges 212 at a plurality of points at or near the gore panel lateral edges 208. The seam joint 210, the edge joint 214, and the edge flanges 212 act together to form the tendon sleeve 200. The tendon sleeve 200 encloses a tendon sleeve passage 216 that is bounded by the seam joint 210, the edge joint 214, and the edge flanges 212, as in FIG. 4. A tendon 218 is positioned between the edge flanges 212. Because, in an example, the edge flanges 212 are a portion of the gore panels 202 that are coupled together at the seam joint 210 and the edge joint 214, the tendon 218 positioned inside the tendon sleeve passage 216 is correspondingly secured to the gore panels 202 and to a balloon formed by the gore panels 202. In an example, the edge joint 214 comprises an edge seal along or proximate to the lateral edges 208 so that the edge flanges 212 are sealed together to form the tendon sleeve 200.

In an example, each tendon sleeve 200 is formed using the material of the gore panels 202 rather than forming a separate sleeve that is coupled to the balloon membrane separately. This simplifies the design and manufacture of the balloon. As demonstrated below, the tendon sleeve 200 described herein allows for systems and methods where the tendon sleeve 200 is formed, the tendon 218 is positioned in the tendon sleeve 200, and the tendon sleeve 200 is coupled to the balloon membrane (formed from the plurality of gore panels 202) all simultaneously (e.g., at the same time, substantially the same time, within a few seconds of each other or the like) so that all three functions are performed within a short period of time by one or more manufacturing operations or in a consolidated manufacturing operation. Alternatively, in an example, one or more of the operations of forming the seam joint 210, positioning the tendon 218, and forming the edge joint 214 are performed separately, either with the same manufacturing operation but separated in time or with more than one manufacturing operation. For example, the seam joint 210 and positioning of the tendon 218 are performed simultaneously (e.g., at the same time, substantially the same time, within a few seconds of each other or the like) and with the formation of the edge joint 214 occurring at a later time.

FIGS. 5-10 show aspects of an example system 300 for forming a tendon sleeve at a seam between adjacent gore panels in order to manufacture an atmospheric balloon. In an example, the system 300 makes the tendon sleeve 200 described with respect to FIGS. 3 and 4, by joining portions of adjacent gore panels 202 together at a seam 204 by forming a seam joint 210 and an edge joint 214, which encloses and secures a tendon 218 along the seam 204.

In an example, the system 300 includes one or more feed mechanisms for feeding a pair of gore panels 202, e.g., a first gore panel and a second gore panel, to be coupled together with a coupling assembly 302 in such a way that the tendon sleeve 200 is formed with a tendon 218 positioned in the tendon sleeve passage 216 formed by the tendon sleeve 200. Alternatively, in an example the gore panels 202 remain stationary, and at least the coupling assembly 302 moves along the lateral edges 208 of the gore panels 202 to form the tendon sleeve 200 and position the tendon 218 within the tendon sleeve passage 216. FIGS. 5-7 and 10 include an arrow 304 representing the direction of relative motion of the gore panels 202 relative to the system 300, e.g., the that the gore panels 202 travel when being fed through the coupling assembly 302, e.g., from a feed end of the coupling assembly 302 toward an exhaust end.

In an example, each gore panel 202 comprises a sealable polymeric membrane material. In an example, each gore panel 202 comprises polyethylene or a co-extruded polyethylene and ethyl vinyl alcohol (EVOH) film.

The coupling assembly 302 includes a seam coupling mechanism 306 to couple the gore panels 202 being fed to the system 300 together to form a seam joint 210 at the seam 204 between adjacent gore panels 202. In an example, the seam coupling mechanism 306 comprises a band sealer, such as that shown in FIGS. 5-7 and 10. The seam coupling mechanism 306 couples the adjacent gore panels 202 together at the seam 204 to form the seam joint 210 between the adjacent gore panels 202. In an example, the seam coupling mechanism 306 includes a band sealer. The band sealer of the seam coupling mechanism 306 compresses the gore panels 202 together and heats a band of the compressed gore panels 202 to cause one or both of the gore panels 202s to temporarily melt or flow, creating a band of molten material that forms the seam joint 210. The seam coupling mechanism 306 is positioned relative to the lateral edges 208 of the gore panels 202 so that the seam joint 210 is spaced from the lateral edges 208. This spacing of the seam coupling mechanism 306 from the lateral edges 208 of the gore panels 202 results in the gore panels 202 forming the edge flanges 212 that protrude from the seam joint 210 toward the lateral edges 208 (see, e.g., FIGS. 3, 4, and 10). In an example, the seam coupling mechanism 306 joins the gore panels 202 together so that the seam joint 210 comprises a seam seal between the adjacent gore panels 202.

As described above, the edge flanges 212 are coupled together at or near the lateral edges 208 of the gore panels 202 by an edge joint 214 so that the edge flanges 212 form a tendon sleeve 200 to secure a tendon 218 to a balloon membrane collectively formed by the gore panels 202. The tendon 218 is thereby secured by the tendon sleeve 200 to an atmospheric balloon formed by the balloon membrane at a seam 204 formed between the recently coupled gore panels 202 (e.g., as with the tendon sleeves 126 shown in FIG. 2). Therefore, in an example, the coupling assembly 302 includes an edge coupling mechanism 308 to couple the pair of edge flanges 212 together with an edge joint 214 at or proximate to the lateral edges 208 of the gore panels 202 to form the tendon sleeve 200. In an example, shown in the system of FIGS. 5-7 and 10, the edge coupling mechanism 308 also seals the pair of edge flanges 212 together to form the tendon sleeve 200, e.g., so that the edge joint 214 comprises an edge seal at or near the lateral edges 208.

Figure 10:
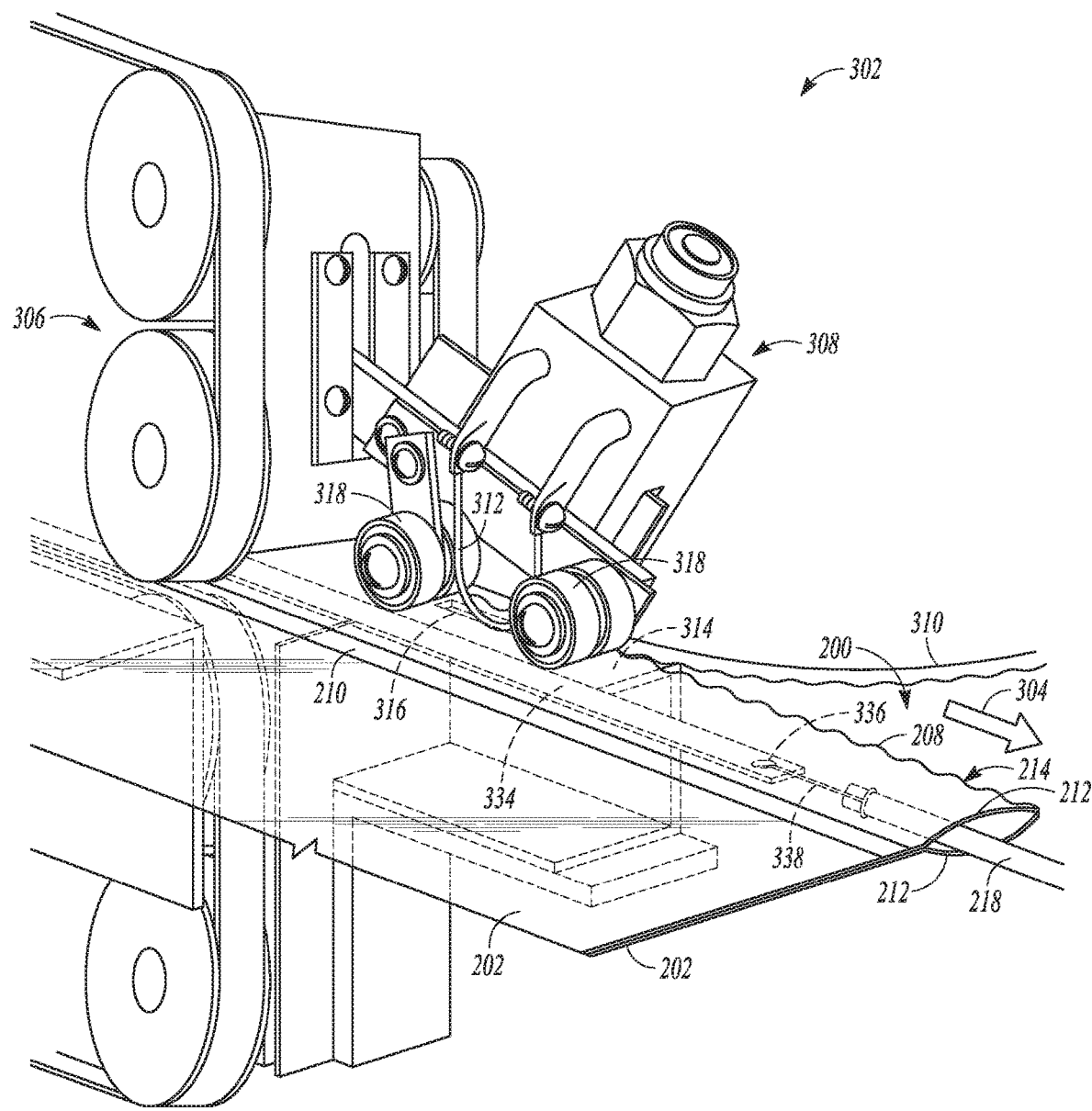
FIG. 10 is a first perspective view of an outlet end the example system for forming a tendon sleeve of FIGS. 5-7 in the operation position with a pair of gore panels fed through the system and a finished tendon sleeve formed at the outlet end of the system.

As shown in FIG. 10, the edge coupling mechanism 308 also includes a cutting station to cut off an excess portion 310 of each of the edge flanges 212 (e.g., the material not needed for the edge joint 214). In an example, the edge coupling mechanism 308 both cuts the excess portions 310 from the edge flanges 212 and couples the edge flanges 212 together. In an example, the edge coupling mechanism 308 is spaced from the seam coupling mechanism 306 by a specified distance, e.g., from about 2 centimeters (cm) (about 0.8 inch) to about 10 cm (about 4 inches), such as about 5 cm (about 2 inches) to about 7.5 cm (about 3 inches), where the spacing distance between the seam coupling mechanism 306 and the edge coupling mechanism 308 defines the width of the edge flanges 212, and thus the width of the tendon sleeve 200 that is formed by the coupling assembly 302.

Referring again to FIG. 10, in an example, the cutting station of the edge coupling mechanism 308 comprises a hot knife structure 312, referred to hereinafter simply as a "hot knife 312." The hot knife 312 cuts the material of the gore panels 202 including the excess portions 310 from the edge flanges 212. The hot knife 312 is heated at least to a melting temperature of the material of the gore panels 202 so that the hot knife 312 melts through the edge flanges 212 and cuts off the excess portions 310 from the edge flanges 212.

In an example, the edge coupling mechanism 308, including the hot knife 312, is configured to both cut the excess portions 310 from the edge flanges 212, and to simultaneously (e.g., at the same time, substantially the same time, within a few seconds of each other or the like to said cutting) couple the edge flanges 212 together to form the edge joint 214. As described above, the hot knife 312 is heated at least to a melting temperature of the material of the gore panels 202 and thus of the edge flanges 212. Because the hot knife 312 melts the edge flanges 212 as it cuts them, the melted portion of the edge flanges 212 are placed in close proximity to one another so that the edge joint 214 is formed by the melted portions of the edge flanges 212 merging together before resolidifying. In an example, the edge coupling mechanism 308 includes a mechanism to compress the edge flanges 212 together at the lateral edges 208 while the portions of the edge flanges 212 are melted (e.g., melted, liquefied, softened, or the like) to form the edge joint 214 between the edge flanges 212.

Figure 5:
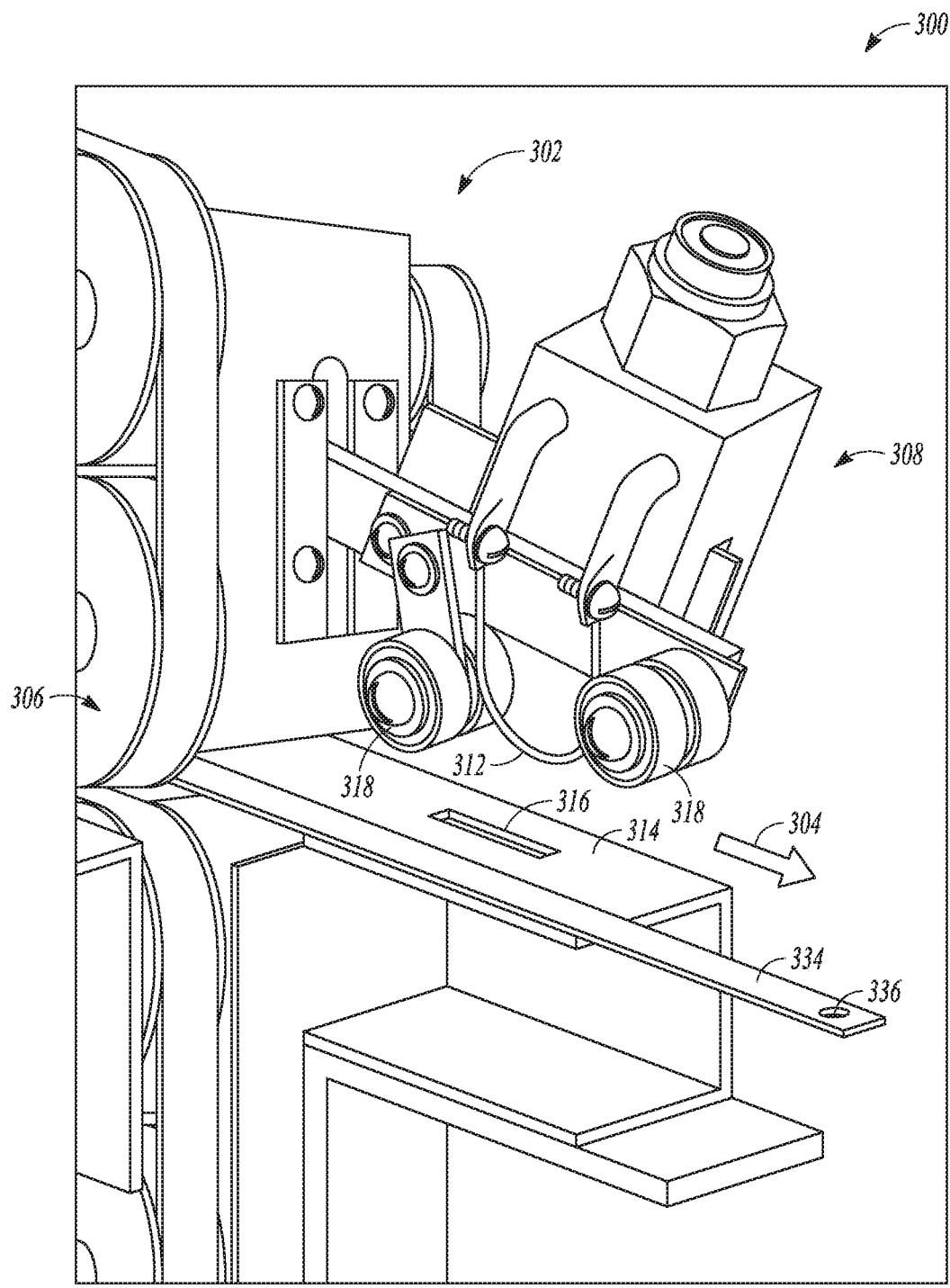
FIG. 5 is a front perspective view of an example system for forming a tendon sleeve at a seam between adjacent gore panels, the system including an example coupling mechanism in a ready position.
Figure 6:
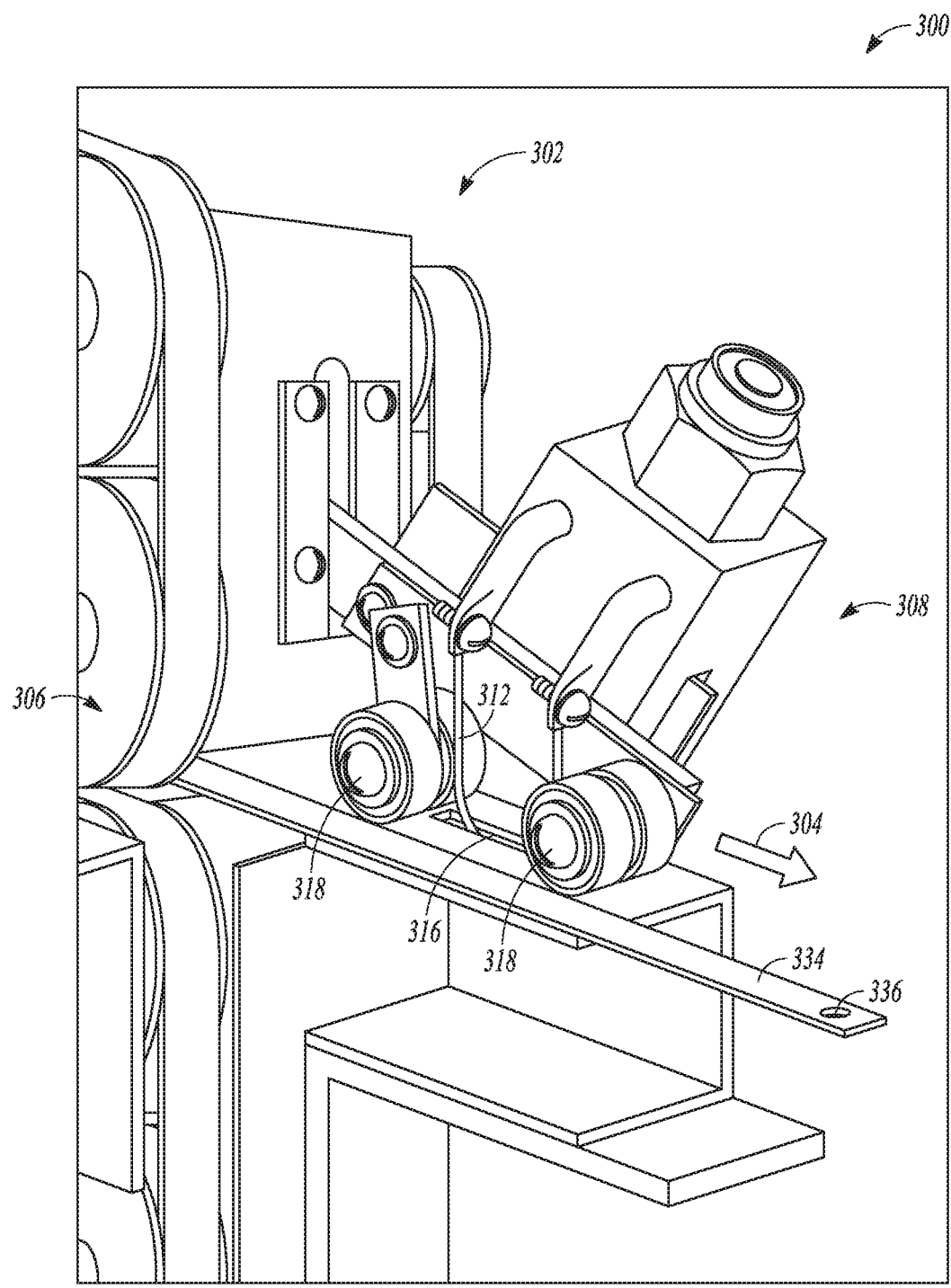
FIG. 6 is a front perspective view of the example system for forming a tendon sleeve of FIG. 5 with the coupling mechanism in an operating position.

In an example, the coupling assembly 302 includes an anvil 314 with a slot 316 configured to receive the hot knife 312. In an example, the coupling assembly 302 also includes one or more rollers 318 or other structures to clamp the edge flanges 212 of gore panel membrane material together. The two edge flanges 212 are clamped between the one or more rollers 318 and the anvil 314 while the hot knife 312 is inserted into the slot 316 so that the hot knife 312 will pass through both of the edge flanges 212. The clamping of the edge flanges 212 between the one or more rollers 318 and the anvil 314 puts the edge flanges 212 in close proximity so that when the hot knife 312 melts the edge flanges 212 to cut off the excess portions 310 of the edge flanges 212, the melted portions of the edge flanges 212 are coupled together to form the edge joint 214 and complete the tendon sleeve 200. FIG. 5 shows a perspective view of the coupling assembly with the hot knife 312 raised above the anvil 314 in a ready position. FIGS. 6 and 10 shows a perspective view of the hot knife 312 after it has been lowered to an operational position with the hot knife 312 inserted into the slot 316 in the anvil 314. FIG. 10 also shows the one or more rollers 318 moved into close proximity with the anvil 314 to clamp the gore panels 202 between the one or more rollers 318 and the anvil 314.

Figure 7:
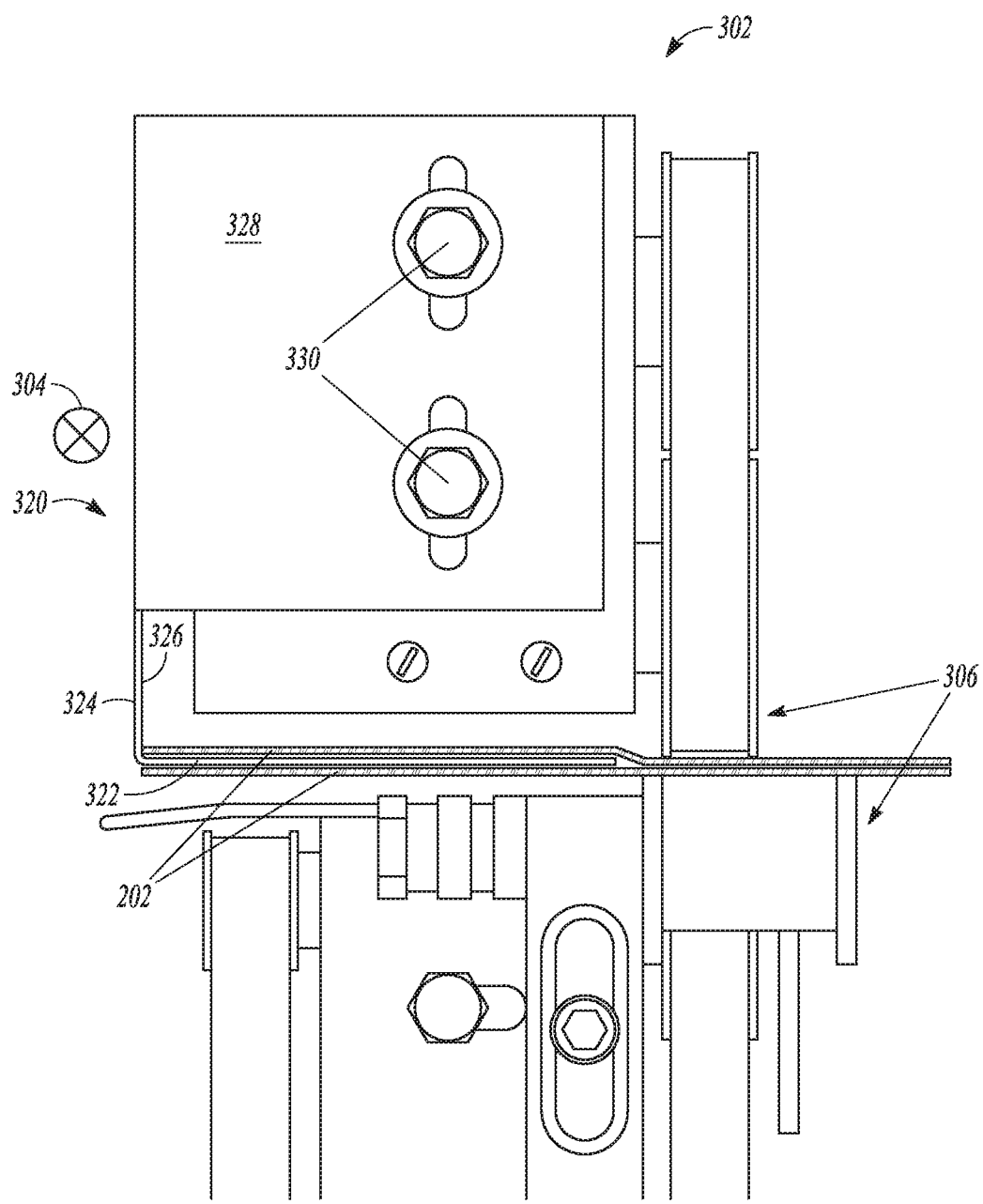
FIG. 7 is an end view of a feed end of the example system for forming a tendon sleeve of FIGS. 5 and 6.

In an example, the coupling assembly 302 also includes a gore panel divider 320 that separates the gore panels 202 being coupled together. In an example, the gore panel divider 320 guides the gore panels 202 into a position to be coupled by the coupling assembly 302, e.g., by the seam coupling mechanism 306 and the edge coupling mechanism 308. FIG. 7 shows a view of the feed end of the coupling assembly 302 (e.g., with the direction of motion 304 of the gore panels 202 being shown as being into the page and away from the viewer in FIG. 7, as represented by the symbol ⊗. FIG. 7 also shows an end view of the gore panel divider 320. In an example, the pair of gore panels 202 are fed to the coupling assembly 302 so that a first gore panel 202 is positioned on one side of the gore panel divider 320, e.g., the top gore panel positioned above the gore panel divider 320 in FIG. 7, and a second gore panel 202 is positioned on the other side of the gore panel divider 320, e.g., the bottom gore panel 202 positioned below the gore panel divider 320 in FIG. 7. The gore panel divider 320 is secured to the coupling assembly 302 to position the gore panel divider 320 relative to the one or more coupling mechanisms of the coupling assembly 302, such as the seam coupling mechanism 306 and the edge coupling mechanism 308.

Figure 8:
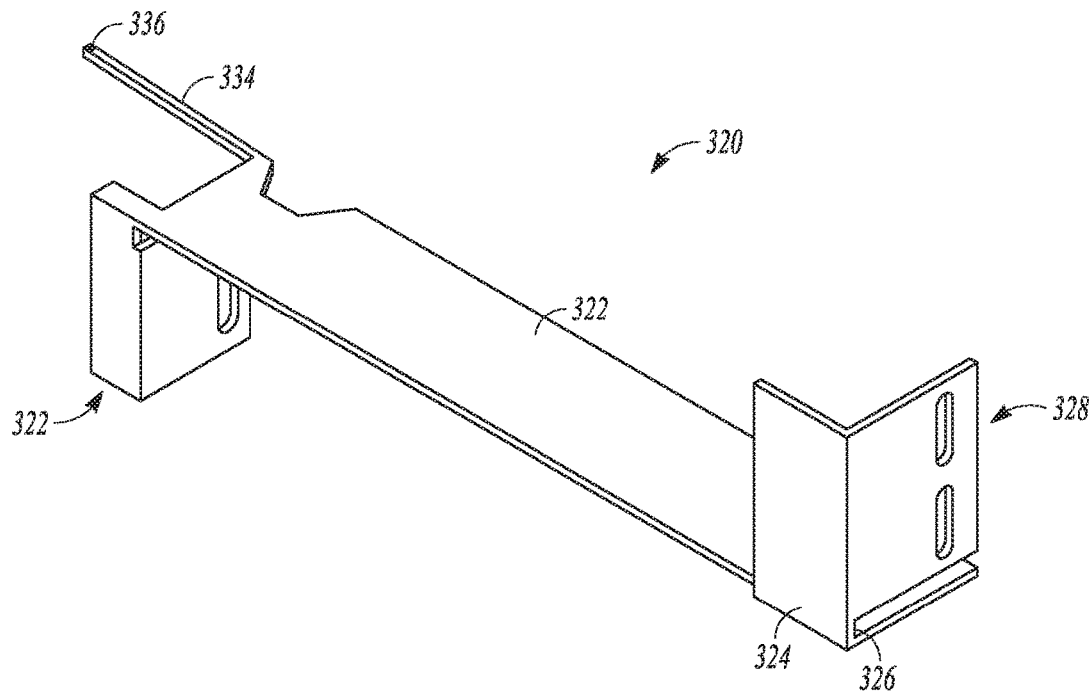
FIG. 8 is a perspective view of an example gore panel divider used with the example system for forming a tendon sleeve of FIGS. 5-7.
Figure 9:
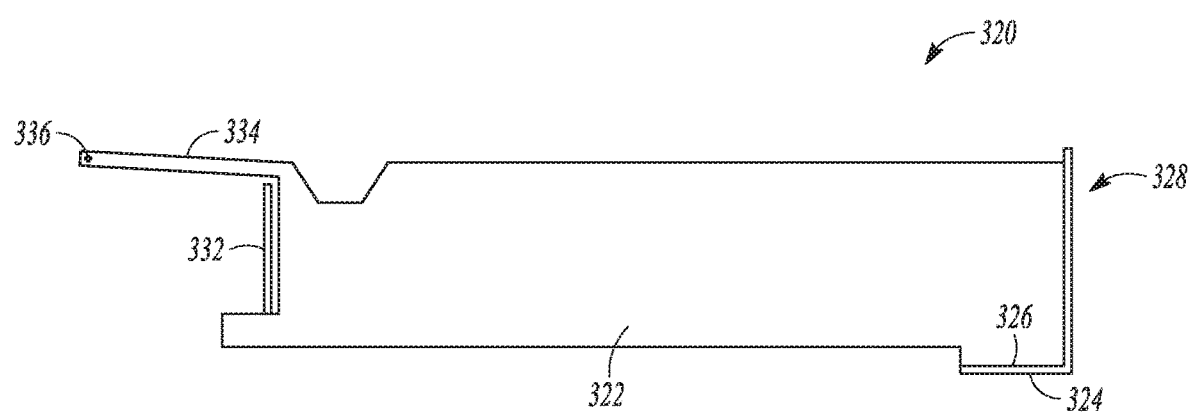
FIG. 9 is a top view of the example gore panel divider of FIG. 8.

FIGS. 8 and 9 show the gore panel divider 320 disconnected from the coupling assembly 302. FIGS. 7-9 show details of an example gore panel divider 320. The example gore panel divider 320 of FIGS. 7-9, in an example, the gore panel divider 320 includes a divider member 322 to separate the gore panels 202, e.g., so that the gore panels 202 are joined and/or sealed at desired locations. In an example, the divider member 322 comprises a sheet of metal or another material. In an example, the gore panel divider 320 also includes a guide member 324 that guides at least one of the gore panels 202 into a specified location and/or alignment with respect to the coupling assembly 302, e.g., with respect to one or both of the seam coupling mechanism 306 and the edge coupling mechanism 308. In an example, the guide member 324 includes a bearing surface 326 that is engaged by an edge of one of the gore panels 202 as the gore panels 202 are fed through the coupling assembly 302. The engagement between the edge of the gore panel 202 and the bearing surface 326 acts to guide the gore panels 202 into the specified position with respect to one or both of the seam coupling mechanism 306 and the edge coupling mechanism 308. In an example, the divider member 322 and the guide member 324 of the gore panel divider 320 are both made from the same sheet of material, such as a sheet of metal that has been bent or otherwise shaped to provide the divider member 322 and the guide member 324.

The gore panel divider 320 also includes an assembly mounting structure 328 provides a location to mount the gore panel divider 320 to the coupling assembly 302, such as with fasteners 330 (as shown in FIG. 7). In an example, the gore panel divider 320 also includes an anvil mounting structure 332 to provide a location to mount the gore panel divider 320, such as with fasteners or other mounting structures or devices. Mounting of the gore panel divider 320 maintains or substantially maintains the position of the gore panel divider 320 relative to one or both of the seam coupling mechanism 306 and the edge coupling mechanism 308 during operation of the system 300.

In an example, the system 300 includes a tendon positioning mechanism to position the tendon 218 at a specified position and orientation relative to the edge flanges 212 while the tendon sleeve 200 is being formed, e.g., while the gore panels 202 are coupled together with the seam joint 210 to form the seam 204 and the edge flanges 212 are coupled together with the edge joint 214 to form the tendon sleeve 200. In an example, the tendon positioning mechanism is included as part of the gore panel divider 320, as described in more detail below). In an example, the tendon positioning mechanism is separate from the gore panel divider 320.

In an example, the tendon positioning mechanism comprises a tendon positioning guide, such as the tendon positioning guide 334 that is part of the gore panel divider 320, as in FIGS. 8 and 9. The tendon positioning guide 334 is positioned relative to the coupling assembly 302 so that the tendon positioning guide 334 is positioned within the tendon sleeve passage 216 when the seam joint 210 and edge joint 214 are formed, as in FIG. 10. A tendon 218 is temporarily secured to the tendon positioning guide 334 such that the tendon 218 is placed between the edge flanges 212 of the gore panels 202 and between the seam joint 210 and the edge joint 214, as shown in FIGS. 3, 4, and 10. In other words, the tendon positioning guide 334 is positioned so that as the gore panels 202 are fed through the coupling assembly 302 and are coupled together, the tendon positioning guide 334 is within the tendon sleeve passage 216 as the tendon sleeve 200 is being formed. The positioning of the tendon positioning mechanism, e.g., the tendon positioning guide 334, in the tendon sleeve passage 216 causes the tendon 218 to be positioned within the edge joint 214 as well.

In an example, as shown in FIGS. 8 and 9, the tendon positioning guide 334 is coupled to and extends from the divider member 322 of the gore panel divider 320 so that the tendon positioning guide 334 will be positioned between the gore panels 202, e.g., vertically between the gore panels 202, and between the seam coupling mechanism 306 and the edge coupling mechanism 308, e.g., laterally between the coupling mechanisms 306, 308, as shown in FIG. 10. In an example, the tendon positioning guide 334 is an integral part of the gore panel divider 320, as shown in FIGS. 8 and 9. A tendon 218 is temporarily secured to the tendon positioning guide 334 with a securing structure, such as via an eye 336 at or proximate to a distal end of the tendon positioning guide 334 to which a tether 338 is secured, as shown in FIG. 10. The secured tendon 218 is then pulled into the tendon sleeve passage 216 as the tendon sleeve 200 is formed.

A tendon positioning mechanism or structure that positions a tendon 218 to be pulled into the tendon sleeve 200, and in particular pulled into the tendon sleeve 200 while the tendon sleeve 200 is being formed, such as the tendon positioning guide 334 shown in the figures, allows for a prefabricated (e.g., precut to a specified length) tendon 218, or a non-prefabricated tendon (e.g., one that is cut close in time to the manufacture of the balloon). The tendon positioning mechanisms or structures described herein also allow for pre-tensioned or untensioned tendons. In some examples, the coupling assembly 302 and the tendon positioning guide 334 provide for foreshortened tendons 218. As used herein, the term "foreshortened," when referring to a tendon that is to be used to provide structural support for an atmospheric balloon, can refer to a tendon with a specified length that is shorter than the corresponding length of the gore panels being supported by the tendon, for example the length of the gore panels 114 between the upper apex 108 and the lower apex 110 of the balloon system 100 shown in FIG. 1. Foreshortened tendons allow the tendons to continue to provide structural support to the balloon membrane when the low temperatures associated with atmospheric flight cause the gore panel material to contract faster than the tendon material contracts due to differences in coefficients of thermal expansion. Foreshortened tendons continue to carry the load of the balloon after the gore panel material has thermally contracted due to the low temperatures experienced at high altitudes.

FIG. 10 shows a perspective view of the system 300 in operation. FIG. 10 shows the gore panels 202 being fed to the coupling assembly 302 from the back of the system 300, as indicated by the arrow for the direction of motion 304. As the gore panels 202 are fed to the coupling assembly 302, the seam coupling mechanism 306 (e.g., a band sealer) couples the gore panels 202 together by forming the seam joint 210, for example by pressing the two gore panels 202 together (as in FIG. 7) and applying heat in a band to form the seam joint 210 at the seam 204 between the gore panels 202. In an example, the seam joint 210 is a seam seal. Substantially simultaneously, the edge coupling mechanism 308 couples the edge flanges 212 of the gore panels 202 together by forming the edge joint 214 at the lateral edges 208 of the edge flanges 212. In an example, the edge joint 214 is an edge seal. In an example, the edge coupling mechanism 308 also cuts off excess portions 310 of the edge flanges 212, for example with the hot knife 312 melting through the edge flanges 212. As described above, in some examples, the edge coupling mechanism 308 includes one or more rollers 318 and an anvil 314 to clamp the edge flanges 212 together and a hot knife 312 that cuts and couples the clamped edge flanges 212 together to substantially simultaneously form the edge joint 214 and cut off the excess portions 310 of the edge flanges 212.

FIG. 10 also show the tendon 218 being positioned in the tendon sleeve passage 216 by a tendon positioning guide 334 as the tendon sleeve 200 is being formed, e.g., as the seam joint 210 and the edge joint 214 are being formed. The tendon 218 is secured to the tendon positioning guide 334, such as by tying the tendon 218 to a tendon securing structure on the tendon positioning guide 334 (e.g., the eye 336) or by securing an intermediate securing structure (e.g., the tether 338) to the tendon securing structure on the tendon positioning guide 334 (e.g., at the eye 336) and then securing the intermediate securing structure (e.g., the tether 338) to the tendon 218, as shown in FIG. 10. As the gore panels 202 are fed to the coupling assembly 302, friction between the edge flanges 212 of the gore panels 202 and the tendon 218 causes the tendon 218 to be threaded through the tendon sleeve 200 so that the tendon 218 is positioned within the tendon sleeve passage 216 when the gore panels 202 are coupled together at the seam joint 210 and the edge joint 214.

Figure 11:
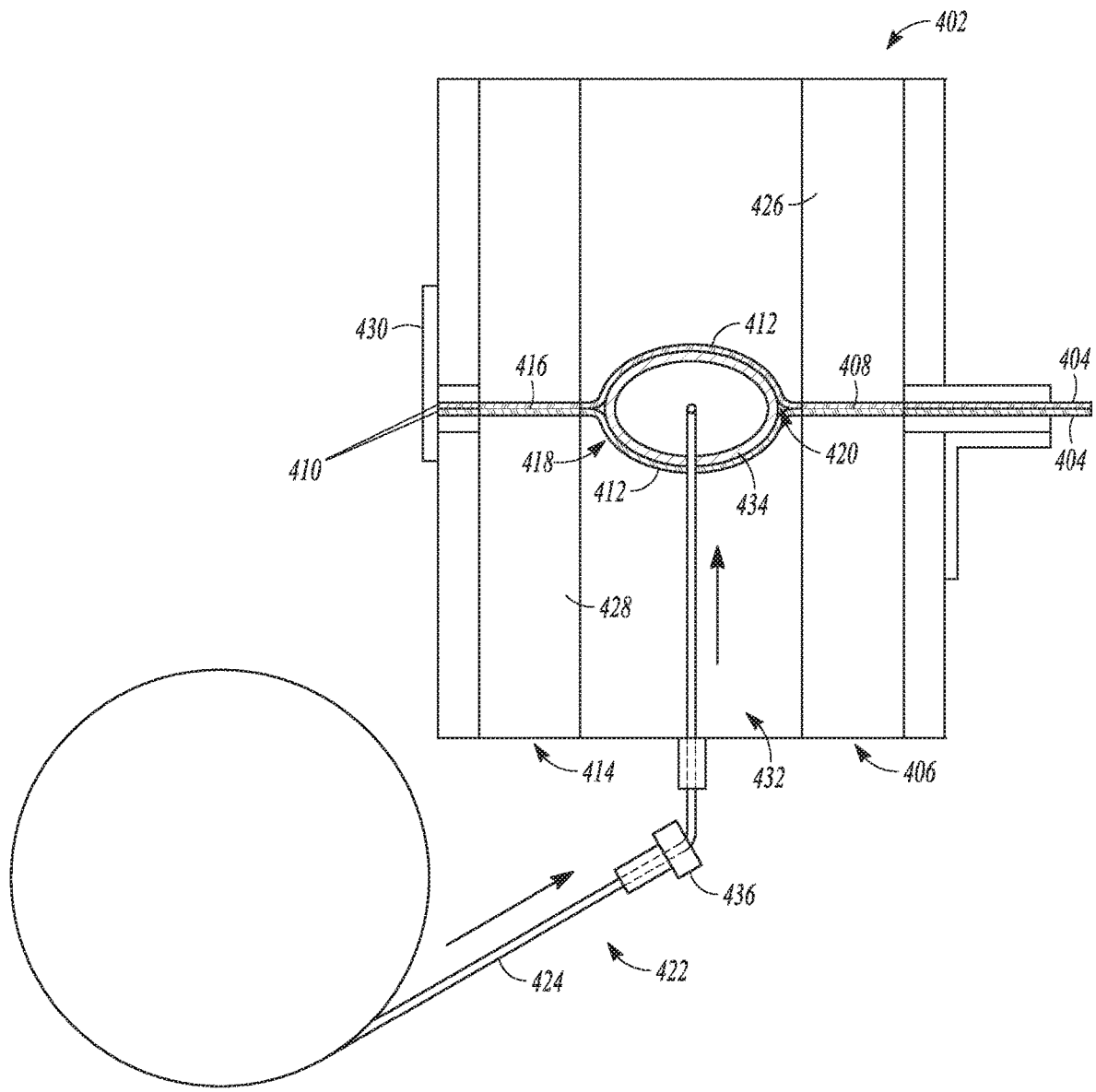
FIG. 11 is a schematic view of another example system for forming a tendon sleeve at a seam between adjacent gore panels.

FIG. 11 shows a schematic diagram of another example system 400 that forms a tendon sleeve at a seam between adjacent gore panels for securing a tendon to an atmospheric balloon. The system 400 shown in FIG. 11 is an alternative to the system 300. Like the system 300 of FIGS. 5-7 and 10, the system 400 includes an example coupling assembly 402 for coupling adjacent gore panels 404 together. Like the coupling assembly 302 of the system 300, the example coupling assembly 402 shown in FIG. 11 includes a seam coupling mechanism 406 to couple a first of the gore panels 404, e.g., the top most of the gore panels 404, to a second of the gore panels 404 at a seam joint 408. The seam joint 408 is spaced from the lateral edges 410 of the gore panels 404, resulting in a pair of edge flanges 412 that protrude from the seam joint 408. The coupling assembly 402 also includes an edge coupling mechanism 414 to couple the pair of edge flanges 412 together by forming an edge joint 416 at or proximate to the lateral edges 410 to form a tendon sleeve 418 with a tendon sleeve passage 420. The example system 400 shown in FIG. 11 also includes a tendon positioning mechanism 422 that positions a tendon 424 within the tendon sleeve passage 420.

Like the coupling assembly of FIGS. 5-7 and 10 described above, the seam coupling mechanism 406 of the example system 400 shown in FIG. 11 is a band sealer, referred to hereinafter as the seam joint band sealer 406. In an example, the seam joint band sealer 406 compresses the gore panels 404 together and applies heat, such as via a heating bar 426, to melt the polymeric material of the gore panels 404 so that the gore panels 404 are combined at a relatively wide seam joint 408. In an example, the edge coupling mechanism 414 of the system 400 in FIG. 11 is also a band sealer, referred to hereinafter as the edge joint band sealer 414. In an example, the edge joint band sealer 414 joins the gore panels 404 together at or near the lateral edges 410 of the edge flanges 412 to form the edge joint 416 and at least partially close the tendon sleeve 418. In an example, the edge joint band sealer 414 compresses the edge flanges 412 together and applies heat, such as via a heating bar 428, to melt the polymeric material of the edge flanges 412 so that the edge flanges 412 combine at a relatively wide edge joint 416. In an example, each of the heating bars 426, 428 of the seam joint band sealer 406 and the edge joint band sealer 414, respectively, comprise a heating and cooling bar 426, 428 that also cools the locations of the seam joint 408 and the edge joint 416, respectively, to solidify the melted and joined portions of the gore panels 404 and the edge flanges 412, respectively, to form the seam joint 408 and the edge joint 416, respectively. A cutting station, such as a hot knife 430, is also provided to cut off excess portions of the edge flanges 412.

The tendon positioning mechanism 422 shown in FIG. 11 is different from that shown in the example system 300 of FIGS. 5-7 and 10. The example tendon positioning mechanism 422 shown in FIG. 11 includes a tendon guide channel 432 positioned between the seam joint band sealer 406 and the edge joint band sealer 414. A tendon guide, such as a tendon guide tube 434, is located within the tendon guide channel 432 to provide a space between the gore panels 404. A tendon feed mechanism 436 feeds the tendon 424 to the tendon guide tube 434, such as with a tendon eye guide 438, so that the tendon 424 will be in the tendon sleeve passage 420 when the tendon sleeve 418 is formed. In an example, a first of the gore panels 404 (e.g., the top gore panel 404 in FIG. 11) is directed to one side of the tendon guide tube 434 (e.g., above the tendon guide tube 434). A second of the gore panels 404 (e.g., the bottom gore panel 404 in FIG. 11) is directed to an opposite side of the tendon guide tube 434 from the first of the gore panels 404 (e.g., below the tendon guide tube 434). The positioning of the first and second gore panels 404 results in the tendon guide tube 434 being located in the space that will become the tendon sleeve passage 420, such that when the tendon 424 is fed into the tendon guide tube 434, the tendon 424 is positioned within the tendon sleeve passage 420 when the tendon sleeve 418 is formed. As the tendon 424 and the gore panels 404 are fed to the coupling assembly 402, the tendon 424 is positioned within the tendon guide tube 434, and thus between the gore panels 404 and also between the seam joint 408 and the edge joint 416 formed by the seam joint band sealer 406 and the edge joint band sealer 414, respectively.

In an example, the bands of both the seam joint band sealer 406 and the edge joint band sealer 414 are mounted on the same wheel shaft, which allows the band speed of both bands to be controlled by the same drive mechanism. This, in turn, provides for substantially synchronized formation of the seam joint 408 and the edge joint 416. In an example, the heating bars 426, 428 are configured with a groove or channel cut therethrough, with the tendon guide (e.g., the tendon guide tube 434) extending the length of the heating bars 426, 428.

Further details regarding balloons and balloon systems in which the tendon sleeves of the present disclosure can be used are described in: U.S. Provisional Patent Application Ser. No. 61/734,820, titled "High Altitude Balloon," filed on Dec. 7, 2012; U.S. patent application Ser. No. 13/827,779, titled "High Altitude Balloon System," filed on Mar. 14, 2013; and U.S. Provisional Patent Application Ser. No. 62/103,790, titled "High Altitude Balloon Apex Assembly," filed on Jan. 15, 2015; the disclosures of which are incorporated herein by reference as if reproduced in their entirety.

In order to provide further detail regarding the aspects of the atmospheric balloon system, the tendon sleeve, the system for forming tendon sleeves, and the method for forming tendon sleeves described herein, the following non-limiting list of Embodiments is provided for illustrative purposes.

EMBODIMENT 1 includes an atmospheric balloon system. The balloon system includes a balloon comprising a balloon membrane having a plurality of gore panels, a plurality of tendons extending from near an upper apex of the balloon to near a lower apex of the balloon, and a plurality of tendon sleeves each located at an intersection between adjacent gore panels. Each of the plurality of tendon sleeves includes first and second edge flanges of respective adjacent gore panels, a seam joint coupling the first and second edge flanges, and an edge joint coupling the first and second edge flanges, the edge joint spaced from the seam joint to form a tendon sleeve passage between the seam joint and the edge joint and between the first and second edge flanges, wherein one of the plurality of tendons is received within the tendon sleeve passage.

EMBODIMENT 2 includes the atmospheric balloon system of EMBODIMENT 1, wherein the edge joint is near to respective lateral edges of the first and second edge flanges, and the seam joint is spaced from the respective lateral edges, relatively.

EMBODIMENT 3 includes the atmospheric balloon system of either one of EMBODIMENTS 1 or 2, wherein the seam joint includes a seam seal at the intersection between respective adjacent gore panels.

EMBODIMENT 4 includes the atmospheric balloon system of any one of EMBODIMENTS 1-3, wherein the edge joint includes an edge seal between the first and second edge flanges.

EMBODIMENT 5 includes a system for securing a tendon on an atmospheric balloon. The system includes a coupling assembly comprising a seam coupling mechanism that forms a seam joint between a first gore panel and a second gore panel, the seam joint is spaced from respective first and second lateral edges of the first gore panel and the second gore panel to form first and second edge flanges; and an edge coupling mechanism that forms an edge joint between the first and second edge flanges and closes a tendon sleeve, the edge joint spaced from the seam joint, the tendon sleeve including a tendon sleeve passage between the seam joint and the edge joint and between the first and second edge flanges. The system also includes a tendon positioning mechanism that positions the tendon within the tendon sleeve passage.

EMBODIMENT 6 includes the system of EMBODIMENT 5, wherein the coupling assembly forms the seam joint and the edge joint substantially simultaneously.

EMBODIMENT 7 includes the system of either one of EMBODIMENTS 5 or 6, wherein the coupling assembly forms the edge joint and the tendon positioning mechanism positions the tendon in the tendon sleeve passage substantially simultaneously.

EMBODIMENT 8 includes the system of any one of EMBODIMENTS 5-7, wherein the coupling assembly forms the seam joint and the edge joint substantially simultaneously with the tendon positioning mechanism positioning the tendon in the tendon sleeve passage.

EMBODIMENT 9 includes the system of any one of EMBODIMENTS 5-8, wherein the seam coupling mechanism comprises a seam sealing mechanism that forms a seam seal between the first gore panel and the second gore panel.

EMBODIMENT 10 includes the system of EMBODIMENT 9, wherein the seam sealing mechanism comprises a first band sealer.

EMBODIMENT 11 includes the system of either one of EMBODIMENTS 9 or 10, wherein the edge coupling mechanism comprises an edge sealing mechanism to form an edge seal between the first and second edge flanges.

EMBODIMENT 12 includes the system of EMBODIMENT 11, wherein the edge sealing mechanism comprises a second band sealer.

EMBODIMENT 13 includes the system of any one of EMBODIMENTS 5-12, wherein the tendon positioning mechanism comprises a tendon positioning guide.

EMBODIMENT 14 includes the system of EMBODIMENT 13, wherein the tendon positioning guide guides the tendon into position between the first and second edge flanges and between the seam joint and the edge joint to secure the tendon within the tendon sleeve.

EMBODIMENT 15 includes the system of either one of EMBODIMENTS 13 or 14, wherein the seam coupling mechanism is adjacent to the edge coupling mechanism.

EMBODIMENT 16 includes the system of EMBODIMENT 15, wherein at least a portion of the tendon positioning guide is between the seam coupling mechanism and the edge coupling mechanism.

EMBODIMENT 17 includes the system of any one of EMBODIMENTS 5-16, further comprising a cutting station.

EMBODIMENT 18 includes the system of EMBODIMENT 17, wherein the cutting station cuts an excess portion of each of the first and second edge flanges.

EMBODIMENT 19 includes the system of any one of EMBODIMENTS 5-18, wherein the edge coupling mechanism cuts excess portions of the first and second edge flanges while coupling the first and second edge flanges together at the edge joint.

EMBODIMENT 20 includes the system of any one of EMBODIMENTS 5-19, wherein the edge coupling mechanism comprises a hot knife.

EMBODIMENT 21 includes the system of EMBODIMENT 20, wherein the hot knife cuts and couples the first and second edge flanges together at the edge joint.

EMBODIMENT 22 includes the system of either one of EMBODIMENTS 20 or 21, wherein the coupling assembly comprises an anvil with a slot for receiving the hot knife.

EMBODIMENT 23 includes the system of any one of EMBODIMENTS 5-22, wherein the coupling assembly comprises a gore panel divider that separates a portion of the first gore panel and a corresponding portion of the second gore panel.

EMBODIMENT 24 includes the system of EMBODIMENT 23, wherein the portion of the first gore panel and the corresponding portion of the second gore panel that are separated by the gore panel divider are adjacent to the seam coupling mechanism.

EMBODIMENT 25 includes the system of either one of EMBODIMENTS 23 and 24, wherein the portion of the first gore panel and the corresponding portion of the second gore panel that are separated by the gore panel divider are adjacent to the edge coupling mechanism.

EMBODIMENT 26 includes any one of EMBODIMENTS 23-25, wherein the tendon positioning mechanism extends from the gore panel divider between the seam coupling mechanism and the edge coupling mechanism.

EMBODIMENT 27 includes a method for forming a tendon sleeve on an atmospheric balloon. The method includes coupling a first gore panel having a first lateral edge to a second gore panel having a second lateral edge at a seam joint spaced from the first and second lateral edges to form respective first and second edge flanges from the first and second gore panels, coupling the first and second edge flanges together at an edge joint spaced from the seam joint to form the tendon sleeve with a tendon sleeve passage between the seam joint and between the edge joint and the first and second edge flanges, and positioning a tendon within the tendon sleeve passage.

EMBODIMENT 28 includes the method of EMBODIMENT 27, wherein coupling the first and second gore panels and coupling the first and second edge flanges are substantially simultaneous.

EMBODIMENT 29 includes the method of either one of EMBODIMENTS 27 or 28, wherein coupling the first and second edge flanges and positioning the tendon are substantially simultaneous.

EMBODIMENT 30 includes the method of any one of EMBODIMENTS 27-29, wherein coupling the first and second gore panels, coupling the first and second edge flanges, and positioning the tendon are substantially simultaneous.

EMBODIMENT 31 includes the method of any one of EMBODIMENTS 27-30, wherein the seam joint includes a seam seal.

EMBODIMENT 32 includes the method of EMBODIMENT 31, wherein coupling the first and second gore panels at the seam joint includes sealing the first gore panel to the second gore panel to form the seam seal.

EMBODIMENT 33 includes the method of any one of EMBODIMENTS 27-32, wherein the edge joint includes an edge seal.

EMBODIMENT 34 includes the method of EMBODIMENT 33, wherein coupling the first and second edge flanges together at the edge joint includes sealing the first edge flange to the second edge flange to form the edge seal.

EMBODIMENT 35 includes the method of any one of EMBODIMENTS 27-34, wherein coupling the first and second edge flanges together at the edge joint includes coupling the first and second edge flanges near the first and second lateral edges.

EMBODIMENT 36 includes the method of any one of EMBODIMENTS 27-35, further comprising cutting the tendon to a specified length.

EMBODIMENT 37 includes the method of EMBODIMENT 36, wherein cutting the tendon to the specified length is performed before positioning the tendon in the tendon sleeve passage.

EMBODIMENT 38 includes the method of any one of EMBODIMENTS 27-37, wherein coupling the first and second gore panels is performed with a seam coupling mechanism.

EMBODIMENT 39 includes the method of any one of EMBODIMENTS 27-38, wherein coupling the first and second edge flanges is performed with an edge coupling mechanism.

EMBODIMENT 40 includes the method of any one of EMBODIMENTS 27-39, wherein positioning the tendon in the tendon sleeve passage is performed with a tendon positioning guide.

EMBODIMENT 41 includes the method of EMBODIMENT 40, wherein the tendon positioning guide is positioned relative to the seam coupling mechanism and the edge coupling mechanism so that at least a portion of the tendon positioning guide is within the tendon sleeve passage when the seam joint and the edge joint are formed.

The above Detailed Description is intended to be illustrative, and not restrictive. For example, the above-described examples (or one or more elements thereof) can be used in combination with each other. Other embodiments can be used, such as by one of ordinary skill in the art upon reviewing the above description. Also, various features or elements can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a molding system, device, article, composition, formulation, or process that includes elements in addition to those listed after such a term in a claim are still deemed to fall within the scope of that claim. Moreover, in the following claims, the terms "first," "second," and "third." etc. are used merely as labels, and are not intended to impose numerical requirements on their objects.

Method examples described herein can be machine or computer-implemented, at least in part. Some examples can include a computer-readable medium or machine-readable medium encoded with instructions operable to configure an electronic device to perform methods or method steps as described in the above examples. An implementation of such methods or method steps can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The Abstract is provided to allow the reader to quickly ascertain the nature of the technical disclosure. It is submitted with the understanding that it will not be used to interpret or limit the scope or meaning of the claims.

Although the invention has been described with reference to exemplary embodiments, workers skilled in the art will recognize that changes may be made in form and detail without departing from the spirit and scope of the invention.

What is claimed is:

1. A method for forming a tendon sleeve on an atmospheric balloon, the method comprising:
    coupling a first gore panel having a first lateral edge to a second gore panel having a second lateral edge at a seam joint spaced from the first and second lateral edges to form respective first and second edge flanges from the first and second gore panels;
    coupling the first and second edge flanges together at an edge joint spaced from the seam joint to form the tendon sleeve with a tendon sleeve passage between the seam joint and between the edge joint and the first and second edge flanges; and positioning a tendon within the tendon sleeve passage;

wherein coupling the first and second edge flanges is performed with an edge coupling mechanism including a first roller laterally spaced from a second roller along a common horizontal plane, a hot knife carried between said first and second rollers, and an anvil having a flat upper surface with a slot, said anvil disposed beneath said rollers and said hot knife with said hot knife constructed and arranged for being received in said slot.

2. The method of claim 1, wherein coupling the first and second gore panels, coupling the first and second edge flanges, and positioning the tendon are substantially simultaneous.

3. The method of claim 1, wherein the seam joint includes a seam seal, and coupling the first and second gore panels seam joint includes sealing the first panel to the second panel to form the seam seal.

4. The method of claim 1, wherein coupling the first and second edge flanges together at the edge joint includes coupling the first and second edge flanges near the first and second lateral edges.

5. The method of claim 1, further comprising cutting the tendon to a specified length before positioning the tendon in the tendon sleeve passage.

6. The method of claim 1, wherein coupling the first and second gore panels is performed with a seam coupling mechanism.

7. The method of claim 1, wherein said edge coupling mechanism performs the steps of clamping said first and second edge flanges against said anvil with said first and second rollers, receiving said hot knife in said slot, cutting said first and second edge flanges with said hot knife in said slot, and sealing said first and second edge flanges together at said edge joint with said hot knife in said slot.

8. The method of claim 1, further comprising heating said hot knife to at least a melting point temperature of the first and second gore panel material and cutting excess portions of the first and second edge flanges, wherein the edge coupling mechanism cuts excess portions of the first and second edge flanges while simultaneously sealing the first and second edge flanges together at the edge joint.

9. The method of claim 1, wherein positioning the tendon in the tendon sleeve passage is performed with a tendon positioning guide, wherein the tendon positioning guide guides the tendon into position between the first and second edge flanges and between the seam joint and the edge joint to secure the tendon within the tendon sleeve.

10. The method of claim 9, wherein coupling the first and second gore panels is performed with a seam coupling mechanism and coupling the first and second edge flanges is performed with the edge coupling mechanism; and wherein the tendon positioning guide is positioned relative to the seam coupling mechanism and the edge coupling mechanism so that at least a portion of the tendon positioning guide is within the tendon sleeve passage when the seam joint and the edge joint are formed.

11. The method of claim 1, further comprising separating the first gore panel and the second gore panel adjacent to a location of the seam joint while coupling the first gore panel to the second gore panel.

12. A system for securing a tendon on an atmospheric balloon, the system comprising:

a coupling assembly comprising:

a seam coupling mechanism that forms a seam joint between a first gore panel and a second gore panel, the seam joint is spaced from respective first and second lateral edges of the first gore panel and the second gore panel to form first and second edge flanges; and an edge coupling mechanism that forms an edge joint between the first and second edge flanges and closes a tendon sleeve, the edge joint spaced from the seam joint, the tendon sleeve including a tendon sleeve passage between the seam joint and the edge joint and between the first and second edge flanges; and a tendon positioning mechanism that positions the tendon within the tendon sleeve passage;

wherein the coupling assembly comprises a gore panel divider that separates a portion of the first gore panel and a corresponding portion of the second gore panel adjacent to the seam coupling mechanism;

wherein the gore panel divider separates the first gore panel and the second gore panel adjacent to the edge coupling mechanism; and, wherein the tendon positioning mechanism extends from the gore panel divider between the seam coupling mechanism and the edge coupling mechanism.

13. The system of claim 12, wherein the seam coupling mechanism comprises a seam sealing mechanism that forms a seam seal that is substantially air tight along an entire length of the seam seal between the first gore panel and the second gore panel, wherein said seam sealing mechanism is laterally spaced from said first and second lateral edges for sealing the first gore panel to the second gore panel along said seam joint.

14. The system of claim 13, wherein the edge coupling mechanism comprises an edge sealing mechanism to form an edge seal that is substantially air tight along an entire length of the edge seal between the first and second edge flanges, wherein said edge sealing mechanism is disposed adjacent a distal end portion of the first and second edge flanges and laterally spaced from the seam sealing mechanism to define a width of the tendon sleeve when forming the edge seal.

15. The system of claim 12, wherein the tendon positioning mechanism comprises a tendon positioning guide, wherein the tendon positioning guide guides the tendon into position between the first and second edge flanges and between the seam joint and the edge joint to secure the tendon within the tendon sleeve, and wherein a securing structure is disposed on the tendon positioning guide, the securing structure being constructed and arranged to receive a tether connected to the tendon.

16. The system of claim 15, wherein the seam coupling mechanism is adjacent to the edge coupling mechanism and at least a portion of the tendon positioning guide is between the seam coupling mechanism and the edge coupling mechanism.

17. The system of claim 12, wherein the edge coupling mechanism cuts excess portions of the first and second edge flanges while coupling the first and second edge flanges together at the edge joint.

* * * * *